US010994283B2

(12) United States Patent
Noh et al.

(10) Patent No.: US 10,994,283 B2
(45) Date of Patent: May 4, 2021

(54) ELECTRONIC DUST COLLECTING APPARATUS AND METHOD OF MANUFACTURING DUST COLLECTOR

(71) Applicant: Samsung Electronics Co., Ltd, Gyeonggi-do (KR)

(72) Inventors: Hyong-soo Noh, Hwaseong-si (KR); Yasuhiko Kochiyama, Seongnam-si (KR); Hye-Won Gil, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 401 days.

(21) Appl. No.: 15/912,157

(22) Filed: Mar. 5, 2018

(65) Prior Publication Data
US 2018/0250685 A1 Sep. 6, 2018

(30) Foreign Application Priority Data

Mar. 6, 2017 (KR) ........................ 10-2017-0028288

(51) Int. Cl.
*B03C 3/47* (2006.01)
*B03C 3/41* (2006.01)
*B03C 3/12* (2006.01)
*B03C 3/08* (2006.01)

(52) U.S. Cl.
CPC .................. *B03C 3/47* (2013.01); *B03C 3/08* (2013.01); *B03C 3/12* (2013.01); *B03C 3/41* (2013.01); *B03C 2201/04* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 2,364,641 | A | * | 12/1944 | Meston | ..................... B03C 3/41 96/62 |
| 2,776,383 | A | * | 1/1957 | Rockafellow | ........ B23K 11/248 307/112 |
| 2,868,319 | A | * | 1/1959 | Rivers | ...................... B03C 3/60 96/67 |
| 3,289,392 | A | * | 12/1966 | Fowler | ..................... B03C 3/45 96/85 |

(Continued)

FOREIGN PATENT DOCUMENTS

| | | |
|---|---|---|
| CN | 1137947 A | 12/1996 |
| CN | 1541772 A | 11/2004 |

(Continued)

OTHER PUBLICATIONS

European Patent Office, "Supplementary European Search Report," Application No. EP 18764663.3, dated Nov. 29, 2019, 12 pages.

(Continued)

*Primary Examiner* — Christopher P Jones
*Assistant Examiner* — Sonji Turner

(57) ABSTRACT

An electronic dust collecting apparatus is provided. The electronic dust collecting apparatus includes a charger, and a dust collector installed downstream of the charger, wherein the dust collector includes a dust collecting sheet including a plurality of first and second electrodes that are alternately arranged therein and a plurality of bent portions that are bent in a zigzag form in such a way that the plurality of first electrodes and the plurality of second electrode face each other.

17 Claims, 18 Drawing Sheets

(56) References Cited

U.S. PATENT DOCUMENTS

| | | | | |
|---|---|---|---|---|
| 3,487,610 | A | * | 1/1970 | Derick .................... H01G 7/023 96/69 |
| 3,665,679 | A | * | 5/1972 | McLain .................... B03C 3/47 96/76 |
| 3,685,258 | A | * | 8/1972 | Kostel .................... B03C 3/32 96/63 |
| 4,357,150 | A | * | 11/1982 | Masuda .................... B03C 3/155 55/500 |
| 4,509,958 | A | * | 4/1985 | Masuda .................... B01D 46/10 55/500 |
| 4,715,870 | A | * | 12/1987 | Masuda .................... B03C 3/155 96/67 |
| 4,750,921 | A | * | 6/1988 | Sugita .................... B03C 3/155 96/67 |
| 4,781,736 | A | * | 11/1988 | Cheney .................... B03C 3/12 96/60 |
| 5,271,763 | A | | 12/1993 | Jang |
| 5,759,240 | A | * | 6/1998 | Becker .................... B03C 3/08 96/100 |
| 6,251,171 | B1 | * | 6/2001 | Marra .................... B03C 3/12 96/69 |
| 7,180,006 | B2 | * | 2/2007 | Kwon .................... H01L 23/49572 174/257 |
| 8,349,052 | B2 | * | 1/2013 | Noh .................... B03C 3/47 95/79 |
| 8,357,233 | B2 | * | 1/2013 | Chan .................... B03C 3/86 96/39 |
| 8,454,733 | B2 | * | 6/2013 | Tanaka .................... B03C 3/155 96/77 |
| 8,470,084 | B2 | | 6/2013 | Ji et al. |
| 8,512,455 | B2 | * | 8/2013 | Yasuhiko .................... B03C 3/86 96/69 |
| 8,690,996 | B2 | * | 4/2014 | Ji .................... C25B 11/02 96/69 |
| 9,795,971 | B2 | * | 10/2017 | Shao .................... B03C 3/41 |
| 2003/0005824 | A1 | * | 1/2003 | Katou .................... B03C 3/155 96/35 |
| 2010/0236411 | A1 | | 9/2010 | Chan |
| 2020/0023377 | A1 | | 1/2020 | Kochiyama et al. |

FOREIGN PATENT DOCUMENTS

| | | |
|---|---|---|
| CN | 105233988 A | 1/2016 |
| CN | 105583078 A | 5/2016 |
| CN | 106196556 A | 12/2016 |
| CN | 108290165 A | 7/2018 |
| DE | 3339828 A1 | 5/1985 |
| EP | 0734772 A1 | 10/1996 |
| EP | 3338893 A1 | 6/2018 |
| JP | H09245933 A | 9/1997 |
| JP | 10-000382 A | 1/1998 |
| JP | 11-028388 A | 2/1999 |
| JP | 2000-015138 A | 1/2000 |
| JP | 2000000488 A | 1/2000 |
| JP | 2000-102745 A | 4/2000 |
| JP | 4156141 B2 | 9/2008 |
| KR | 10-2010-0067572 A | 6/2010 |
| KR | 101523209 B1 | 5/2015 |
| KR | 10-2017-0059125 A | 5/2017 |
| WO | 2017086636 A1 | 5/2017 |

OTHER PUBLICATIONS

International Search Report dated Jun. 7, 2018 in connection with International Patent Application No. PCT/KR2018/002046.

Written Opinion of the International Searching Authority dated Jun. 7, 2018 in connection with International Patent Application No. PCT/KR2018/002046.

Office Action dated Mar. 23, 2020 in connection with Chinese Patent Application No. 201880014449.X, 13 pages.

Communication pursuant to Article 94(3) EPC dated Mar. 17, 2021 in connection with European Patent Application No. 18 764 663.3, 8 pages.

Office Action dated Feb. 24, 2021 in connection with India Patent Application No. 201917035366, 6 pages.

* cited by examiner

2002

ELECTRONIC DUST COLLECTING APPARATUS AND METHOD OF MANUFACTURING DUST COLLECTOR

CROSS-REFERENCE TO RELATED APPLICATIONS

This application is related to and claims priority from Korean Patent Application No. 10-2017-0028288, filed on Mar. 6, 2017, the contents of which are incorporated herein by reference.

TECHNICAL FIELD

Embodiments according to the present disclosure relate to an electronic dust collecting apparatus and a manufacturing method of a dust collector, for manufacturing convenience and enhanced productivity.

BACKGROUND

Pollutants such as dust and aerosol included in air in a confined space such as home, a room, a shopping mall, a factory, and an office bring problems to people's health. Such pollutants are generated during smoking, cooking (such as by roasting meat or fish), cleaning, welding, grinding, an operation of an internal combustion engine, and so on, in a limited space.

To remove pollutants in air, an electronic dust collecting apparatus has been widely used. The electronic dust collecting apparatus is installed in an air conditioning device such as an air cleaner, a humidifier, and an air conditioner to perform air cleaning.

FIG. 1 is a diagram showing a concept of an example of an electronic dust collecting apparatus 100.

Referring to FIG. 1, some the electronic dust collecting apparatus 100 may include a charger 101 and a dust collector 102 installed at a downstream of the charger 101.

The electronic dust collecting apparatus 100 may allow outside air introduced into the charger 101 in a direction F shown in FIG. 1 to pass through the dust collector 102 and to be externally re-discharged through a fan (not shown) disposed at an upstream or downstream of the electronic dust collecting apparatus 100.

The charger 101 may include discharge electrodes 1011 and corresponding electrodes 1012 disposed between the discharge electrodes 1011. The discharge electrodes 1011 may be formed as wire electrodes installed between a pair of the corresponding electrodes 1012 and, in general, may be formed of a tungsten wire.

Although FIG. 1 illustrates an example in which the discharge electrodes 1011 are disposed between the pair of corresponding electrodes 1012, for convenience of description, a charger may include a plurality of discharge electrodes and a plurality of corresponding electrodes that are alternately disposed between the plurality of corresponding electrodes.

A voltage may be applied to the discharge electrode 1011 (e.g., in some cases of a voltage of approximately 3 to 7 kV is applied to the discharge electrodes 1011) to charge pollutants included in air with plus (+) polarity or minus (−) polarity via corona discharge of the discharge electrodes 1011 and the corresponding electrodes 1012. Hereinafter, for convenience of description, an example of in which pollutants in air passing through the charger 101 are charged with plus polarity will be described.

The dust collector 102 may be formed by stacking a plurality of plus electrodes 1021 and a plurality of minus electrodes 1022, which are formed like a flat plate, at a constant interval. For example, the plus electrodes 1021 and the minus electrodes 1022 may be formed by printing a surface of a stack film with carbon ink or may be formed as a metallic plate, such as an aluminum plate.

Accordingly, when a predetermined voltage is applied between the plus electrodes 1021 and the minus electrodes 1022 of the dust collector 102, an electric field may be formed between the plus electrodes 1021 and the minus electrodes 1022. Here, with regard to the plus electrode and the minus electrode, an electrode at a higher voltage relative to another electrode is represented with the plus electrode and an electrode at a low level is represented with the minus electrode. Hereinafter, the same concept will be used in the description of the present disclosure.

Pollutants that are charged with plus polarity while passing through the charger 101 may be attached to the minus electrodes 1022 of the dust collector 102 while passing through the dust collector 102 disposed at a downstream of the charger 101, thereby removing pollutants in air. Accordingly, air passing through the dust collector 102 may be discharged from the electronic dust collecting apparatus 100 in a clean state in which pollutants are removed.

However, the electronic dust collecting apparatus 100 may be manufactured by separately preparing the plurality of plus electrodes 1021 and the plurality of minus electrodes 1022 included in the dust collector 102 and, then, assembling the electrodes at a predetermined interval and, accordingly, it may be difficult to manufacture the electronic dust collecting apparatus 100 as one or more structures thereof are complicated.

SUMMARY

Exemplary embodiments of the present disclosure overcome the above disadvantages and other disadvantages not described above. Also, the present disclosure is not required to overcome the disadvantages described above, and an exemplary embodiment of the present disclosure may not overcome any of the problems described above.

The present disclosure provides an electronic dust collecting apparatus and a method of manufacturing a dust collector, for manufacturing convenience and enhanced productivity by integrally configuring a plurality of electrodes configuring a dust collector to form a dust collecting sheet.

According to certain embodiments of the present disclosure, an electronic dust collecting apparatus includes a charger, and a dust collector installed downstream of the charger, wherein the dust collector includes a dust collecting sheet including a plurality of first electrodes and a plurality of second electrodes which are alternately arranged therein and a plurality of bent portions that are bent in a zigzag form in such a way that the plurality of first electrodes and the plurality of second electrodes face each other.

The plurality of first electrodes may include a high-voltage electrode, and the plurality of second electrodes may include a low-voltage electrode with a lower voltage than the plurality of first electrodes.

The plurality of first and second electrodes may be formed along a width direction of the dust collecting sheet, and the plurality of first electrodes and the plurality of second electrodes may be alternately stacked in a longitudinal direction of the dust collecting sheet.

The plurality of bent portions may be formed in a zigzag form in a longitudinal direction of the dust collecting sheet between the plurality of first electrodes and the plurality of second electrodes.

The dust collecting sheet may include a plurality of openings that are formed in the plurality of bent portions, respectively.

The dust collecting sheet may include a plurality of slits that are formed in the plurality of bent portions, respectively, and the plurality of slits may form the plurality of openings via bending of the dust collecting sheet, respectively.

The plurality of slits may be formed in parallel to the first and second electrodes in a longitudinal direction of the plurality of first electrodes and the plurality of second electrodes.

The slits may be formed in a central portion between the plurality of first electrodes and the plurality of second electrodes on the dust collecting sheet.

A portion of the plurality of second electrodes may be exposed outside the dust collecting sheet.

The dust collecting sheet may include a first sheet on which the plurality of first electrodes and the plurality of second electrodes are arranged on one surface thereof and a second sheet coupled to the one surface of the first sheet, and the slits may be formed along a one-side edge of the plurality of second electrodes to expose the one-side edge of the plurality of second electrodes.

The plurality of second electrodes may include a plurality of grooves concave from the one-side edge, and the slits may be formed along the one-side edge of the plurality of second electrodes.

The dust collecting sheet may include at least one of a plurality of through holes or a plurality of through slits configured to externally expose the plurality of second electrodes.

The dust collecting sheet may include a first sheet and a second sheet laminated to one surface of the first sheet, and the plurality of first and second electrodes may be configured with a conductive pattern printed or deposited on the one surface of the first sheet.

The plurality of first and second electrodes may be formed of a material with electric resistance of about $10^7$ Ω·cm or more.

The charger may include a plurality of discharge electrodes with a high voltage applied thereto and a plurality of corresponding electrodes arranged between the plurality of discharge electrodes, plus power and minus power may be alternately supplied to the plurality of discharge electrodes, and plus power and minus power may be alternately supplied to the plurality of first electrodes to correspond to the discharge electrodes.

The charger may include a first switch configured to convert a polarity of a voltage applied to the plurality of discharge electrodes and the plurality of corresponding electrodes, and the dust collector may include a second switch configured to convert a polarity of a voltage applied to the plurality of first electrodes and the plurality of second electrodes.

According to another aspect of the present disclosure, an electronic dust collecting apparatus includes a charger, and a dust collector downstream of the charger, wherein the dust collector includes a first dust collecting sheet including a plurality of high-voltage electrodes arranged therein and a plurality of first bent portions that are bent in a zigzag form between the plurality of high-voltage electrodes, and a second dust collecting sheet including a plurality of low-voltage electrodes arranged therein and a plurality of second bent portions that are bent in a zigzag form between the plurality of low-voltage electrodes, and the first dust collecting sheet and the second dust collecting sheet are arranged in an interdigital structure in which the plurality of high-voltage electrodes and the plurality of low-voltage electrodes alternately face each other.

The first and second dust collecting sheets may include a plurality of openings that are formed in the plurality of first and second bent portions, respectively, and an end of the first bent portion, which is adjacent to the second dust collecting sheet, and an end of the second bent portion, which is adjacent to the first dust collecting sheet, may be open and the low-voltage electrode may be inserted between the facing high-voltage electrodes.

According to certain embodiments of the present disclosure, a method of manufacturing a dust collector, the method including printing a plurality of electrode patterns in parallel to each other on one surface of a first sheet, coupling a second sheet to the one surface of the first sheet with the plurality of electrode patterns printed thereon to form a dust collecting sheet, forming a plurality of slits between the plurality of electrode patterns on the dust collecting sheet, and bending the dust collecting sheet in a zigzag form to form a plurality of bent portions in such a way that the plurality of electrode patterns face each other.

Power of different polarities may be supplied to facing electrode patterns among the plurality of electrode patterns.

Additional and/or other aspects and advantages of embodiments according to the present disclosure will be set forth in part in the description which follows and, in part, will be obvious from the description, or may be learned by practice of the invention.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWING

For a more complete understanding of the present disclosure and its advantages, reference is now made to the following description taken in conjunction with the accompanying drawings, in which like reference numerals represent like parts.

DETAILED DESCRIPTION

Figure 1:
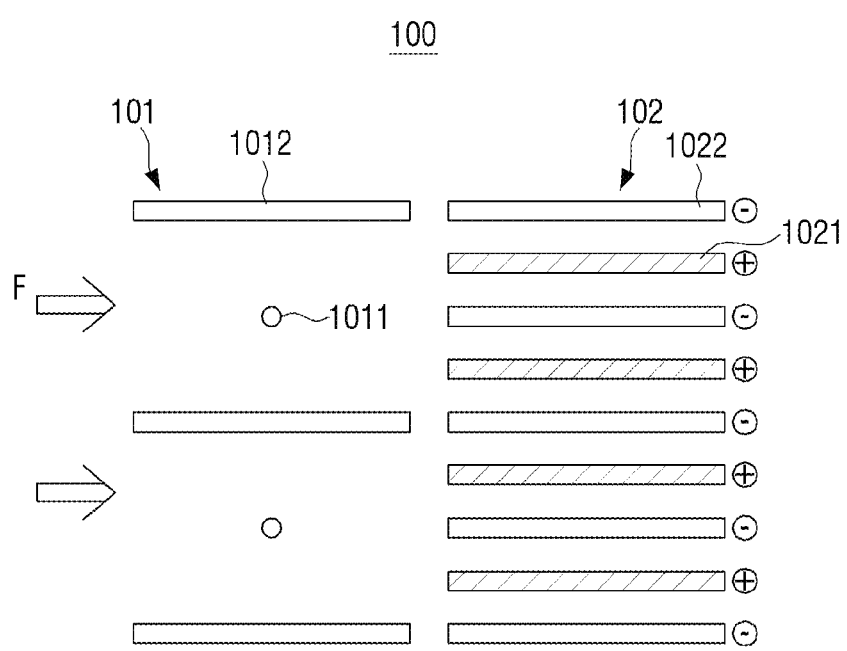
FIG. 1 illustrates an example of an electronic dust collecting apparatus.

FIGS. 1 through 18, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The present disclosure will now be described more fully with reference to the accompanying drawings, in which exemplary embodiments of the present disclosure are shown. The present disclosure may, however, be embodied in many different forms and should not be construed as being limited to the embodiments set forth herein; rather, these embodiments are provided so that this disclosure will be thorough and complete, and will fully convey the concept of the present disclosure to those of ordinary skill in the art.

Accordingly, the invention may be embodied in many different forms and the different forms belong to the technical scope of the present disclosure. Hereinafter, with regard to reference numerals of the attached drawings, for convenience of understanding of the embodiments, related components among components that perform the same function in the embodiments will be denoted with the same or similar reference numerals.

As described above, in the following description, an electrode at a high level based on a voltage difference between the two electrodes is represented with the plus electrode and an electrode at a low level is represented with the minus electrode.

Figure 2:
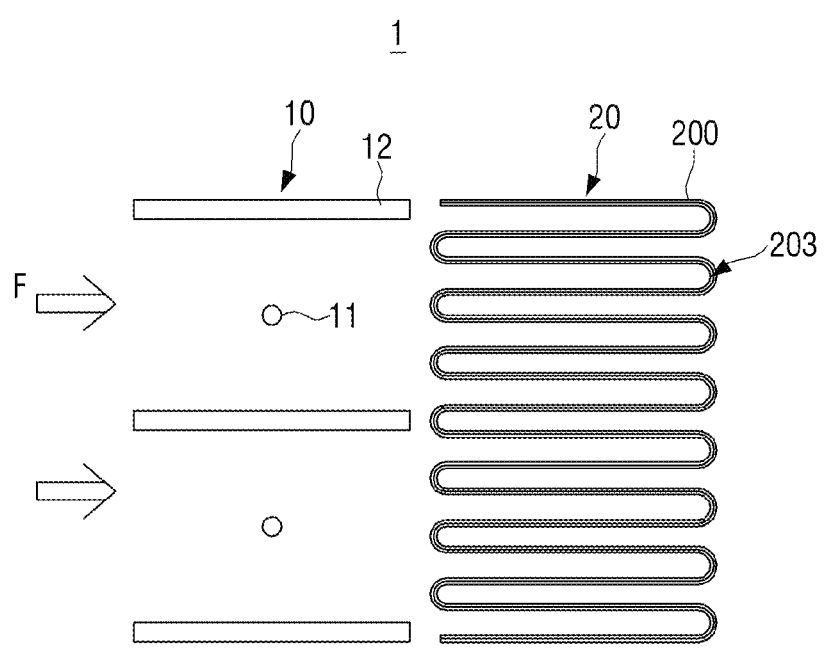
FIG. 2 illustrates an electronic dust collecting apparatus according to certain embodiments of the present disclosure.

FIG. 2 illustrates an electronic dust collecting apparatus 1 according to some embodiments of the present disclosure.

Referring to the non-limiting example of FIG. 2, an electronic dust collecting apparatus 1 according to some embodiment of the present disclosure may include a charger 10 and a dust collector 20.

The electronic dust collecting apparatus 1 may be disposed in a housing (not shown) and may allow outside air introduced into the charger 10 to pass through the dust collector 20 and to be externally re-discharged through a fan (not shown) disposed upstream or downstream of the electronic dust collecting apparatus 1. The electronic dust collecting apparatus 1 according to at least one embodiment of the present disclosure may be embodied as an air cleaner or an air conditioner with an air cleaning function or may be disposed inside an air conditioner.

The charger 10 may be a component for charging pollutants in air, such as dust, and may include a plurality of discharge electrodes 11 and a plurality of corresponding electrodes 12. A discharge electrode 11 may be disposed between a pair of corresponding electrodes 11. Accordingly, when a predetermined voltage is applied to the discharge electrodes 11 and the corresponding electrodes 12, corona discharge may occur between one discharge electrode 11 and a pair of corresponding electrodes 12, thereby charging pollutants passing through the charger 10.

The discharge electrodes 11 may be formed as wire electrodes and, for example, may use a tungsten wire. The corresponding electrodes 12 may be formed as a flat plate and may be formed of a conductive metallic plate. For example, the corresponding electrodes 12 may be formed as an aluminum plate.

The aforementioned charger 10 may in some embodiments, be a wire-plate structure using high-voltage discharge but may include various devices for discharge using a carbon brush electrode or an acicular electrode or charging pollutants with specific polarity.

The dust collector 20 may include a dust collecting sheet 200 formed by continuously bending one sheet to collect dust charged by the charger 10.

The dust collecting sheet 200 may include a plurality of bent portions 203 formed via continuous bending of the single dust collecting sheet 200 in a zigzag form. For example, as shown in FIG. 2, the dust collecting sheet 200 may have a rectangular shape with a longer vertical length than a horizontal length in a state in which the dust collecting sheet 200 is spread based on FIG. 2 and may be continuously bent in a zigzag form in a longitudinal direction to form the plurality of bent portions 203. However, the dust collecting sheet is not limited thereto and may be configured with a longer horizontal length than a vertical length and, in addition, may include a plurality of bent portions formed by continuously bending the dust collecting sheet in a zigzag form in a horizontal direction according to a shape of the electronic dust collecting apparatus 1 including the dust collector 20.

The dust collector 20 may be configured to dispose the plurality of bent portions 203 between a pair of the corresponding electrodes 12 of the charger 10. For example, the dust collector 20 may be configured to dispose ten bent portions 203 between the pair of corresponding electrodes 12. Thereby, charged pollutants introduced into the dust collector 20 may be effectively adsorbed onto the dust collector 20. A detailed configuration of the dust collector 20 will be described below.

Figure 3:
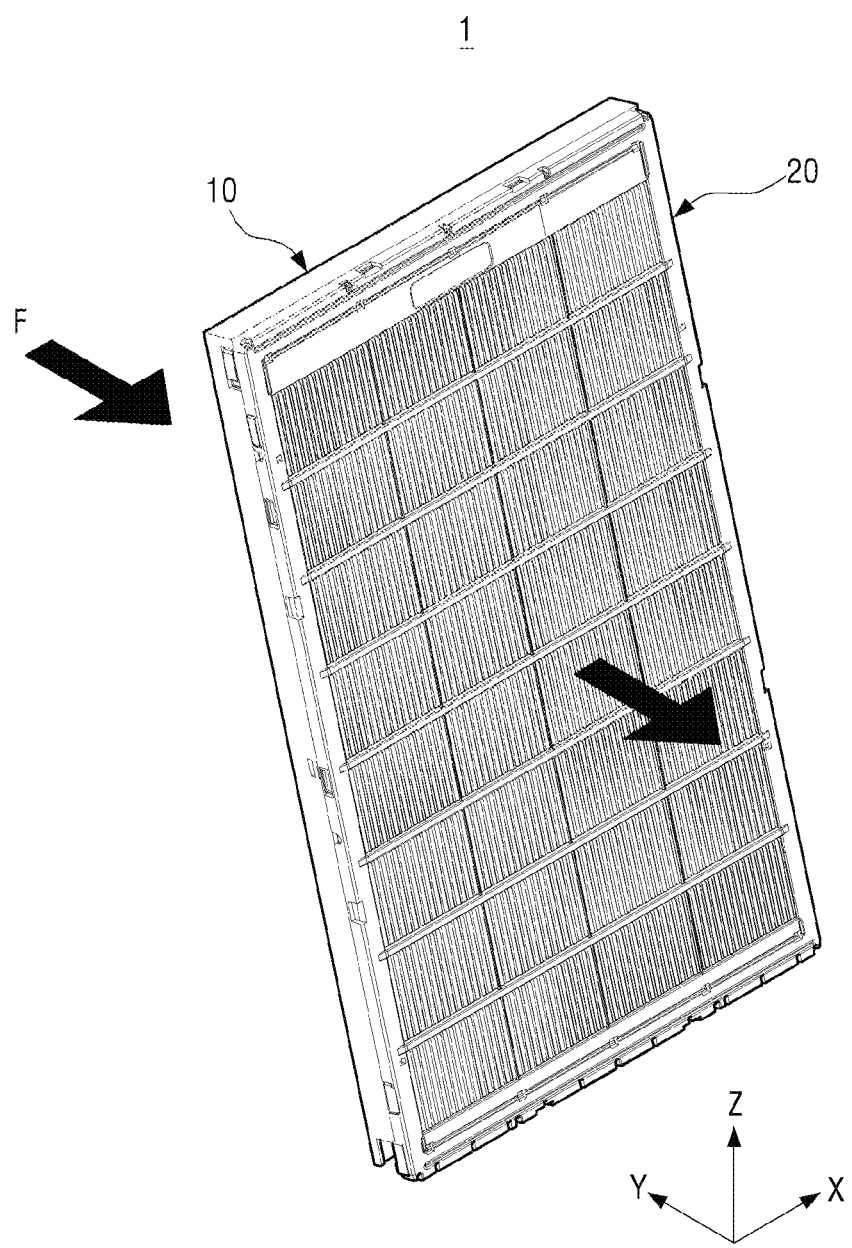
FIG. 3 illustrates an electronic dust collecting apparatus according to some embodiments of the present disclosure.
Figure 4:
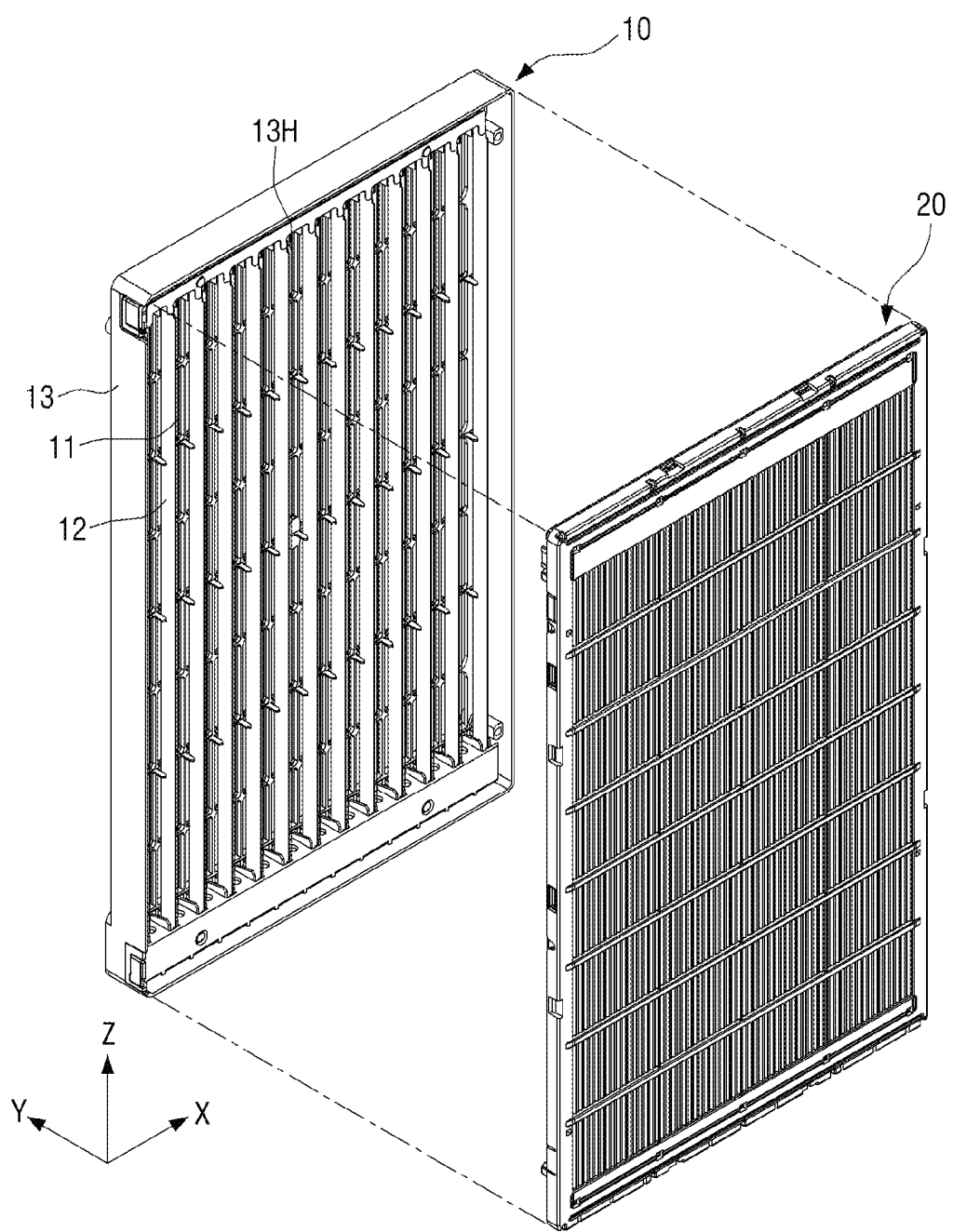
FIG. 4 illustrates, in exploded perspective view, the electronic dust collecting apparatus shown in FIG. 3.

FIG. 3 illustrates, in a perspective view, an electronic dust collecting apparatus 1 according to some embodiments of the present disclosure. FIG. 4 illustrates, in exploded perspective view, the electronic dust collecting apparatus 1 shown in FIG. 3.

As shown in FIGS. 3 and 4, according to some embodiments, the electronic dust collecting apparatus 1 may include charger 10 and dust collector 20 coupled to the charger 10 to face the same. Thereby, outside air may sequentially pass through the dust collector 20 from the charger 10 in a direction F shown in FIG. 3 to remove pollutants.

As described above, the charger 10 may include the plurality of discharge electrodes 11 and the plurality of corresponding electrodes 12 disposed between the plurality of discharge electrodes 11 and, in addition, may include a charging cover 13 for supporting the plurality of discharge electrodes 11 and the plurality of corresponding electrodes 12.

As shown in FIG. 4, the plurality of discharge electrodes 11 and the plurality of corresponding electrodes 12 may extend in a longitudinal direction (a direction Z of FIG. 4) of the charging cover 13 in the charging cover 13 and may be alternately arranged in parallel to each other in a width direction (a direction X of FIG. 4) of the charging cover 13.

The plurality of discharge electrodes 11 may be formed of a metallic wire, for example, a tungsten wire and the plurality of corresponding electrodes 12 may be formed as a plate formed of a metallic material, such as aluminum, to extend in a longitudinal direction of the plurality of discharge electrodes 11.

A high voltage may be applied to the discharge electrodes 11 to charge pollutants included in air with plus (+) polarity or minus (−) polarity via corona discharge of the discharge electrodes 11 and the corresponding electrodes 12. Hereinafter, for convenience of description, an example of in which pollutants in air passing through the charger 10 are charged with plus polarity will be described.

As shown in the non-limiting example of FIG. 4, charging cover 13 may be formed like a frame for fixing opposite ends of the plurality of discharge electrodes 11 and the plurality of corresponding electrodes 12 and may include a plurality of suction ports 13H that are formed like lattices therein. Accordingly, outside air may be introduced through the plurality of suction ports 13H of the charging cover 13 and pollutants included in the introduced air may be charged via corona discharge between the plurality of discharge electrodes 11 and the plurality of corresponding electrodes 12 and may be moved to the dust collector 20 disposed at downstream of the charger 10.

Figure 5:
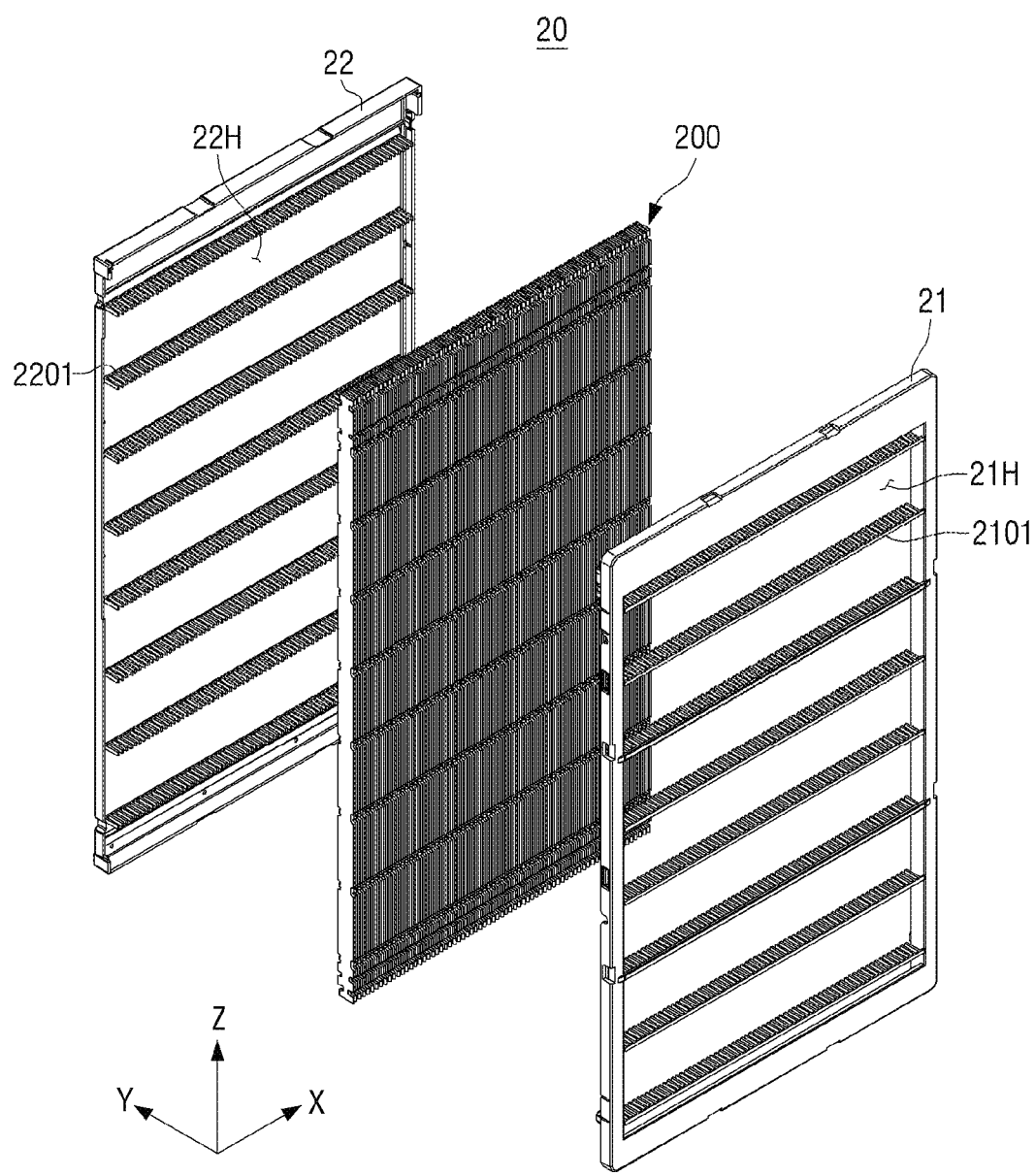
FIG. 5 illustrates, in exploded perspective view, the dust collector shown in FIG. 4.

FIG. 5 illustrates, in an exploded perspective view, a dust collector 20 according to certain embodiments of this disclosure, such as shown in FIG. 4.

Referring to the non-limiting example of FIG. 5, the dust collector 20 may include the dust collecting sheet 200 including the plurality of bent portions 203 formed therein and first and second covers 21 and 22 for covering the dust collecting sheet 200.

The first and second covers 21 and 22 may be formed like a frame that surrounds an external side of the dust collecting sheet 200 and may allow air passing through the charger 10 to pass through the dust collecting sheet 200 via openings 21H and 22H which are formed in the first and second covers 21 and 22, respectively.

As described above, the dust collecting sheet 200 may be formed by bending the single dust collecting sheet 200 in a zigzag form to form a plurality of bent portions and, thus, may further include a plurality of support members 2101 and 2201 that are formed on the first and second covers 21 and 22, respectively, to support the dust collecting sheet 200.

The plurality of support members 2101 and 2201 may be arranged at a predetermined interval on the openings 21H and 22H of the first and second covers 21 and 22 and may stably support the dust collecting sheet 200.

In addition, a power connection member (not shown) that is connected to the dust collecting sheet 200 to supply power to the dust collecting sheet may be arranged on the first and second covers 21 and 22.

Figure 6:
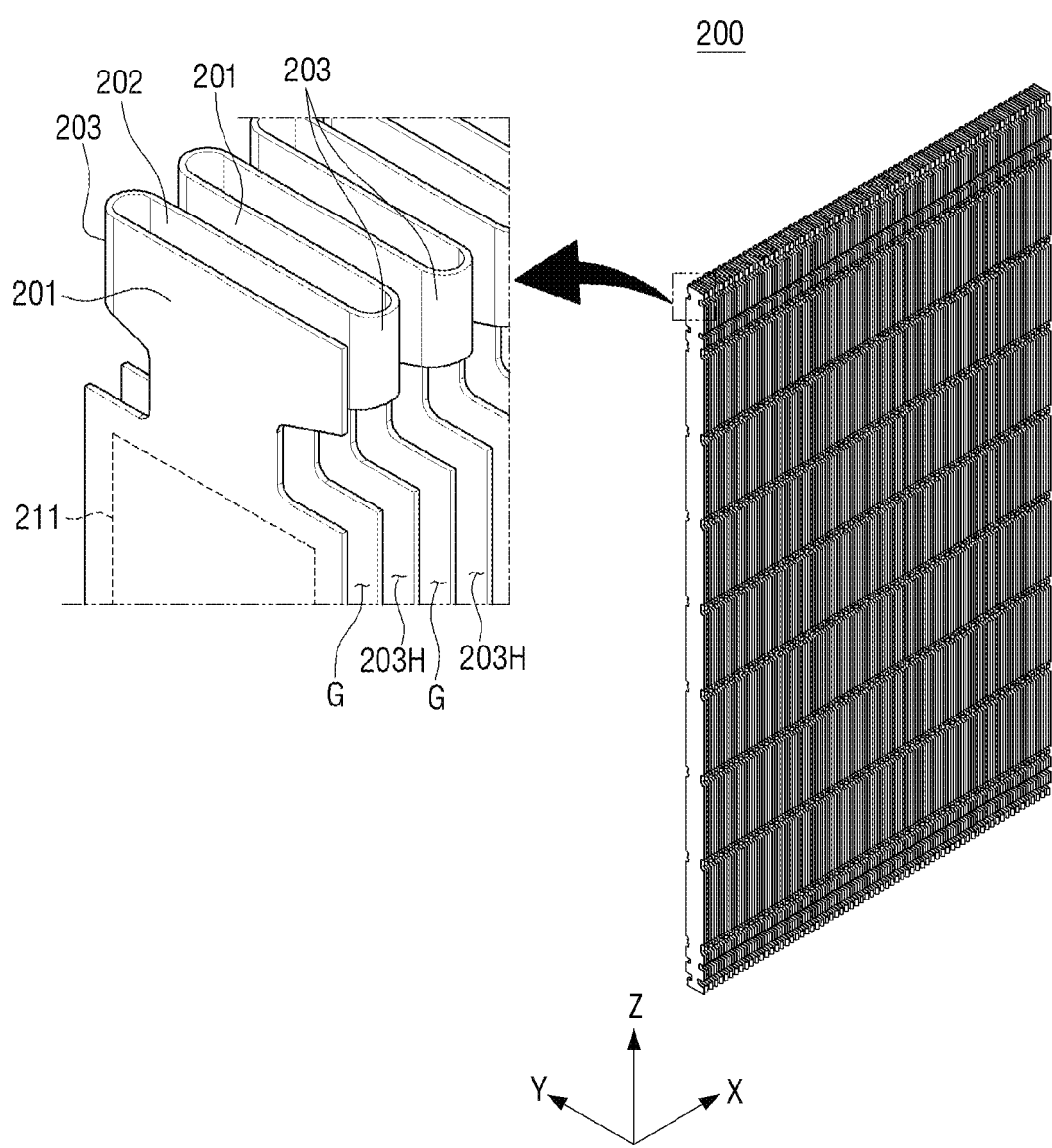
FIG. 6 illustrates an enlarged perspective view of a portion of the dust collecting sheet shown in FIG. 5.
Figure 7:
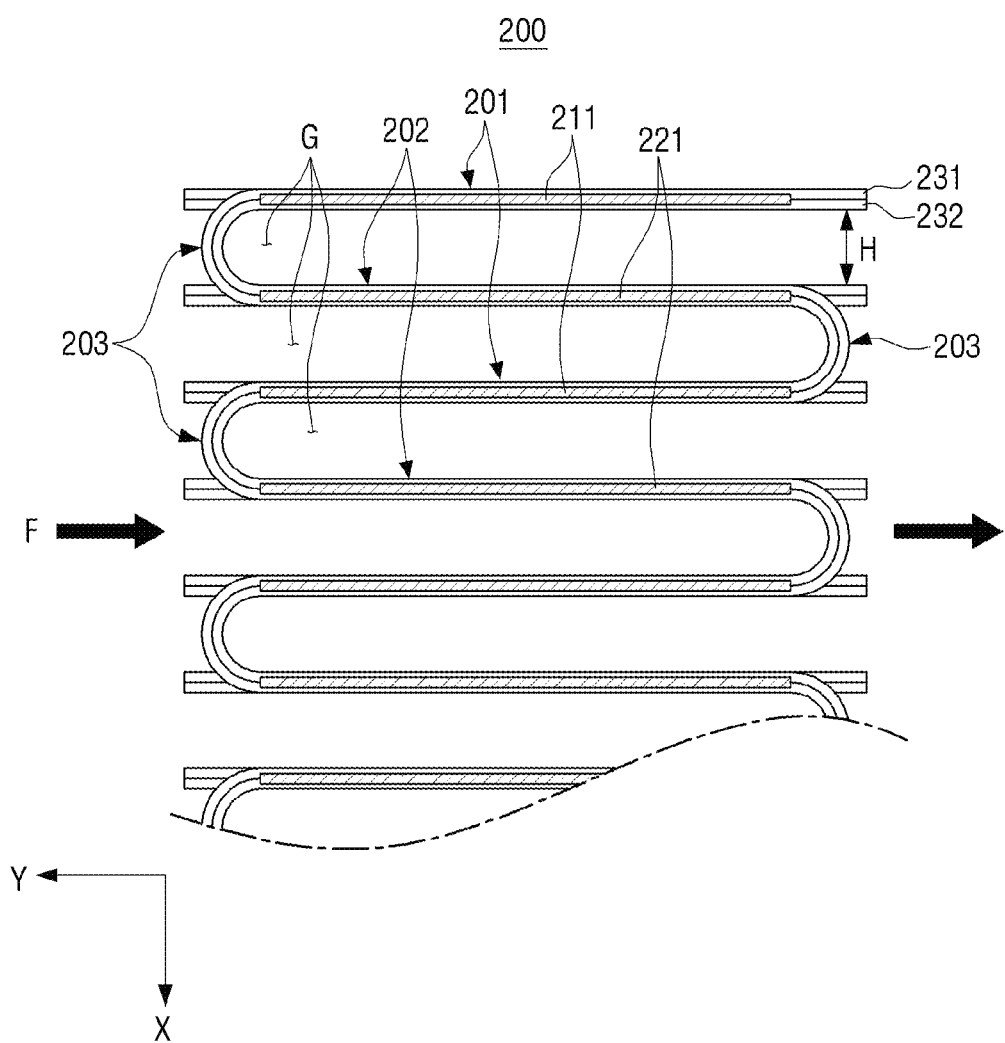
FIG. 7 illustrates a lateral cross-sectional view of the dust collecting sheet shown in FIG. 6.

FIG. 6 illustrates an enlarged perspective view of a portion of the dust collecting sheet 200 shown in FIG. 5. FIG. 7 illustrates a lateral cross-sectional view of the dust collecting sheet 200 shown in FIG. 6.

Hereinafter, structural details of certain embodiments of the dust collecting sheet 200 according to this disclosure, wherein the dust collecting sheet 200 is bent in a zigzag form will be described with reference to FIGS. 6 and 7. Prior to a description of the detailed structure of the dust collecting sheet 200, the dust collecting sheet 200 shown in FIG. 6, although an example in which the dust collecting sheet 200 that has a longer horizontal length than a vertical length prior to bending is bent in a horizontal direction in a zigzag form to form the plurality of bent portions 203 is illustrated, as described above, the dust collecting sheet 200 may be modified depending on a shape of the electronic dust collecting apparatus 1 from a shape of the dust collecting sheet 200 prior to bending and a bending direction of the dust collecting sheet 200 in a spread state prior to bending may also be changed in various ways.

FIG. 7 illustrates a lateral cross-sectional view obtained by rotating the dust collecting sheet 200 shown in FIG. 6 by 90 degrees. Hereinafter, a horizontal, vertical, width, or longitudinal direction of the dust collecting sheet 200 is a relative concept defined depending on a viewing direction and may be changed in various ways depending on a reference direction.

As shown in the non-limiting example of FIG. 7, the dust collecting sheet 200 may include a plurality of first electrodes 211 and a plurality of second electrodes 221 which are alternately arranged.

As described above, the dust collecting sheet 200 may be configured by bending a flat dust collecting sheet 200 configured as one sheet to form the plurality of bent portions 203 and, the single dust collecting sheet 200 may be configured by laminating a second sheet 232 (such as the sheet shown in FIG. 8) to one surface of a first sheet 231 (such as the sheet shown in FIG. 8) with the plurality of first electrodes 211 and the plurality of second electrodes 221 that are arranged on one surface thereof. A structure of certain embodiments of a dust collecting sheet 200 including the first and second sheets 231 and 232 will be described below.

According to certain embodiments, a plurality of bent portions 203 may be formed via bending of the dust collecting sheet 200 in a zigzag form in such a way that the plurality of first electrodes 211 and the plurality of second electrodes 221 face each other.

The dust collecting sheet 200 may include a plurality of flat surfaces 201 and 202 that are arranged to each other at a predetermined interval via bending and the plurality of bent portions 203 may be arranged between two facing flat surfaces 201 and 202 among the plurality of flat surfaces 201 and 202 to connect the two flat surfaces 201 and 202.

One pair of facing flat surfaces 201 and 202 may include a first flat surface 201 and a second flat surface 202, the dust collecting sheet 200 may include a plurality of first flat surfaces 201 and a plurality of second flat surfaces 202 that are alternately arranged in parallel to each other, and the bent portions 203 for connecting the first flat surfaces 201 and the second flat surfaces 202 may be formed in a zigzag form at opposite sides as the dust collecting sheet 200 is bent in a zigzag form.

In addition, the first electrode 211 may be arranged on the first flat surface 201 and the second electrode 221 may be arranged on the second flat surface 202 and, accordingly, the plurality of first electrodes 211 and the plurality of second electrodes 221 that are alternately arranged in the dust collecting sheet 200 may be arranged to each other by the plurality of bent portions 203.

The plurality of first electrodes 211 and the plurality of second electrodes 221 that are alternately arranged in the dust collecting sheet 200 may have an approximately rectangular shape that is formed long in a width direction (a direction Z of FIG. 6) of the dust collecting sheet 200.

As shown in the non-limiting example of FIGS. 6 and 7, the bent portion 203 may be bent to form a curved surface between the first flat surface 201 and the second flat surface 202 of the dust collecting sheet 200. Alternatively, the bent portion 203 may be bent in a perpendicular direction from the first flat surface 201 and the second flat surface 202 and may be formed with an edge type by folding a portion between the first flat surface 201 and the second flat surface 202 of the dust collecting sheet 200 in a straight line.

According to some embodiments, the plurality of bent portions 203 of the dust collecting sheet 200 may be formed between the plurality of first electrodes 211 and the plurality of second electrodes 221. Accordingly, the plurality of bent portions 203 may be formed in a zigzag form in a longitudinal direction (direction X shown in FIG. 6) of the dust collecting sheet 200 between the plurality of first electrodes 211 and the plurality of second electrodes 221.

In some embodiments, the first flat surface 201 including the first electrode 211 formed therein may be arranged at one side of the bent portion 203 and the second flat surface 202 including the second electrodes 221 formed therein may be arranged at the other end side of the bent portion 203 to face the first flat surface 201. Thereby, the plurality of first electrodes 211 and the plurality of second electrodes 221 may be alternately stacked in a longitudinal direction of the dust collecting sheet 200.

In addition, the first flat surface 201 including the first electrode 211 formed therein, the bent portion 203, and the second flat surface 202 including the second electrode 221 formed therein may be continuously arranged to easily collect pollutants in air passing between the plurality of first flat surfaces 201 and the plurality of second flat surfaces 202.

The dust collecting sheet 200 may, according to some embodiments, include a plurality of openings 203H that are formed in the plurality of bent portions 203, respectively. Thereby, the dust collecting sheet 200 may pass air introduced into one side through the charger 10 through the plurality of openings 203H.

As shown in FIGS. 6 and 7, according to certain embodiments, the plurality of first flat surfaces 201 and the plurality of second flat surfaces 202 and, accordingly, a gap G for allowing air to pass may be formed between the plurality of first flat surfaces 201 and the plurality of second flat surfaces 202.

Accordingly, air passing through the charger 10 may be introduced into the gap G and air passing through the gap G may pass through the dust collecting sheet 200 via the openings 203H formed in the bent portion 203 corresponding to the gap G.

In addition, in some embodiments, the plurality of bent portions 203 are formed in a zigzag form and, thus, air passing through the charger 10 may be first introduced into the openings 203H formed in the bent portion 203 and air introduced into the openings 203H may pass through the dust collecting sheet 200 via the corresponding gap G.

As such, the dust collecting sheet 200 may pass air through the gap G formed between the first flat surface 201 and the second flat surface 202 and the openings 203H formed in the bent portion 203.

Power of different polarities may be applied to the plurality of first electrodes 211 and the plurality of second electrodes 221 that are arranged in the plurality of first flat surfaces 201 and the plurality of second flat surfaces 202, respectively, facing each other, thereby form an electric field between the first electrodes 211 and the second electrodes 221.

According to some embodiments, the plurality of first electrodes 211 may be configured as a high-voltage electrode and the plurality of second electrodes 221 may be configured as a low-voltage electrode with a lower voltage than in the first electrode 211. For example, high-voltage power may be applied to the plurality of first electrodes 211 and the plurality of second electrodes 221 may be grounded to form a voltage difference between the first electrode 211 and the second electrode 221.

Power of plus polarity may be applied to the plurality of first electrodes 211 and power of minus polarity may be applied to the plurality of second electrodes 221 to form an electric field between the first electrodes 211 and the second electrodes 221. In addition, a high voltage of plus polarity may be applied to the first electrode 211 and the second electrode 221 may be grounded to form an electric field between the first electrode 211 and the second electrode 221.

Accordingly, pollutants, which are charged with plus polarity while passing through the charger 10, may be adsorbed onto the second electrode 221 as a minus electrode, i.e., the second flat surface 202 including the second electrode 221 formed therein while passing through the gap G between the first flat surface 201 and the second flat surface 202.

When a high voltage of minus polarity may be applied to the discharge electrodes 11 to charge pollutants passing through the charger 10 with minus polarity, a high voltage of minus polarity may be applied to the plurality of first electrodes 211 of the dust collector 20 to adsorb pollutants onto the second flat surface 202 including the plurality of second electrodes 221 formed therein as a plus electrode.

As such, air including charged pollutants may be adsorbed onto the plurality of second electrodes 221 to be purified while passing through the plurality of gaps G formed by bending the dust collecting sheet 200 in a zigzag form.

The dust collecting sheet 200 may further include a separate interval maintaining member (not shown) for maintaining an interval between the first flat surface 201 and the second flat surface 202 to maintain a constant height (or a size; H) of the gap G.

The interval maintaining member may be arranged between the first flat surface 201 and the second flat surface 202 to support the first flat surface 201 and the second flat surface 202 with a constant interval and may configure a height of the interval maintaining member in various ways to set the height (H) of the gap G to correspond to the height of the interval maintaining member.

In some embodiments, the interval maintaining member may be formed of hot melt glue such as glue hot melted on the dust collecting sheet 200 to have a predetermined width and height or may be formed by attaching double-side adhesive with a constant width and height to the dust collecting sheet 200.

For example, when the interval maintaining member may be continuously coated on one surface of the dust collecting sheet 200 in a spread state prior to bending and the dust collecting sheet 200 is bent in a zigzag form to form the bent portions 203, the height of the interval maintaining member may be determined in such a way that the sum of heights of two connected interval maintaining members is equal to the predetermined height H of the gap G.

That is, when the interval maintaining member with a height of ½ of the height H of the gap G is formed on an upper surface of the dust collecting sheet 200 in a spread state, if the dust collecting sheet 200 is bent, the first flat surface 201 and the second flat surface 202 that face each other may be supported by the interval maintaining member and, accordingly, the height H of the gap G formed between the first flat surface 201 and the second flat surface 202 may be maintained constant as a desired interval.

In addition, as well as the aforementioned interval maintaining member formed of hot melt, the interval maintaining member may be formed of an elastic conductive material or may be formed in the form of points or columns arranged between the first flat surface 201 and the second flat surface 202.

However, the interval maintaining member may be formed with a uniform and narrow width if possible to prevent an air flow passing through the gap G from being interrupted and to minimize formation of an electric field between the first electrode 211 and the second electrode 221 from being interrupted.

Figure 8:
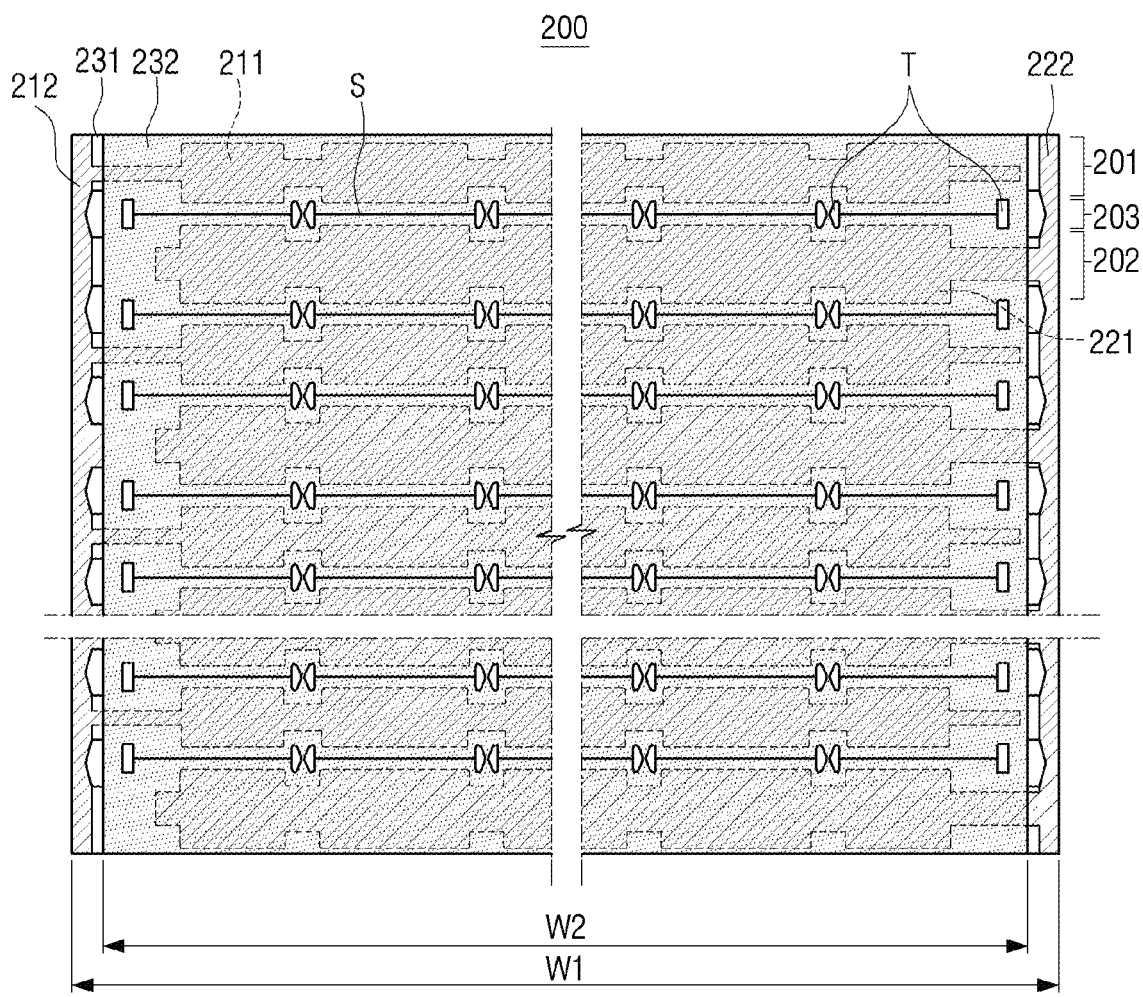
FIG. 8 illustrates a plan view of the dust collecting sheet shown in FIG. 7 prior to a bending.

FIG. 8 illustrates a plan view showing development of a dust collecting sheet according to certain embodiments of this disclosure, such as dust collection sheet 200 shown in FIG. 7, prior to bending.

The dust collecting sheet 200 shown in the non-limiting example of FIGS. 6 and 7 may be formed by first manufacturing the dust collecting sheet 200 in a spread state shown in FIG. 8 and then bending the dust collecting sheet 200 in a spread state in a zigzag form.

Hereinafter, a structure of the dust collecting sheet 200 according to certain embodiments, including the first and second sheets 231 and 232 will be described in detail with reference to FIG. 8.

The plan view of the dust collecting sheet 200 shown in the non-limiting example of FIG. 8 shows the dust collection sheet in a state in which the dust collecting sheet 200 shown in FIG. 6 is rotated by 90 degrees and, as described above, a horizontal, vertical, width, or longitudinal direction of the dust collecting sheet 200 is a relative concept defined depending on a viewing direction and, may be changed in various ways depending on a reference direction.

The dust collecting sheet 200 may include the first sheet 231 and the second sheet 232 laminated to the first sheet 231 and, thereby, the first and second sheets 231 and 232 may be integrally configured to form one sheet of the dust collecting sheet 200.

According to certain embodiments, the plurality of first electrodes 211 and the plurality of second electrodes 221 may be alternately arranged on one surface of the first sheet 231, and the second sheet 232 may be coupled to one surface of the first sheet 231 including the plurality of first electrodes 211 and the plurality of second electrodes 221 formed thereon, and accordingly, the plurality of first electrodes 211 and the plurality of second electrodes 221 may be arranged between the first sheet 231 and the second sheet 232. The first sheet 231 and the second sheet 232 may be laminated via adhesives.

In some embodiments, the plurality of first and second electrodes 211 and 221 may be alternately arranged at a predetermined interval on one surface of the first sheet 231. The plurality of first and second electrodes 211 and 221 may be configured with a conductive pattern printed or deposited on one surface of the first sheet 231 and may be formed by printing one surface of the first sheet 231 with conductive carbon ink or depositing conductive metal such as aluminum on one surface of the first sheet 231.

In some embodiments, a first power connector 212 connected to the plurality of first electrodes 211 to apply power to the plurality of first electrodes 211 and a second power connector 222 that is connected to the plurality of second electrodes 221 to apply power to the plurality of second electrodes 221 may be arranged on one surface of the first sheet 231.

The first and second power connectors 212 and 222 may be configured with a conductive pattern printed or deposited on one surface of the first sheet 231 using the same method as that of the plurality of first and second electrodes 211 and 221.

The first and second power connectors 212 and 222 may be exposed outside the dust collecting sheet 200 to receive power from the outside. Thereby, a width W1 of the first sheet 231 may be greater than a width W2 of the second sheet 232, the first power connector 212 may be arranged at a left end of the first sheet 231, and the second power connector 222 may be arranged at a right end of the first sheet 231.

In addition, the second sheet 232 may be coupled to a central portion of one surface of the first sheet 231, and accordingly, the first and second power connectors 212 and 222 may be exposed outside an upper surface of the first sheet 231, and the plurality of first electrodes 211 and the plurality of second electrodes 221 are connected to the first and second power connectors 212 and 222, respectively, may be arranged between the first sheet 231 and the second sheet 232.

High-voltage power may be applied to the first power connector 212 from the outside to configure the plurality of first electrodes 211 as a high-voltage electrode and the second power connector 222 may be grounded to configure the plurality of second electrodes 221 as a low-voltage electrode.

The dust collecting sheet 200 may include a plurality of slits S formed between the plurality of first electrodes 211 and the plurality of second electrodes 221.

As shown in the non-limiting example of FIG. 8, the plurality of slits S may, in some embodiments, be incisions formed through the dust collecting sheet 200 and may be formed in the plurality of bent portions 203, respectively, and widened via bending of the dust collecting sheet 200 to form the plurality of openings 203H through which air passes. Alternatively, the plurality of slits S may be formed in the form of a hole that occupies a predetermined area in the dust collecting sheet 200 in a spread state.

The dust collecting sheet 200 may include the plurality of bent portions 203 formed via bending between the plurality of first electrodes 211 and the plurality of second electrodes 221 and, accordingly, the plurality of slits S may be formed in a central portion between the first electrode 211 and the second electrode 221 on the dust collecting sheet 200.

As described above, the dust collecting sheet 200 may, in certain embodiments, include the plurality of bent portions 203 formed via bending between the plurality of first electrodes 211 and the plurality of second electrodes 221 in a zigzag form in such a way that the first electrode 211 and the second electrode 221 face each other.

In addition, the plurality of slits S may be formed in a longitudinal direction of the first and second electrodes 211 and 221 in parallel to the first and second electrodes 211 and 221 and, accordingly, may be formed in a central portion of the bent portion 203, thereby forming the openings 203H in the central portion of the bent portion 203.

As shown in FIG. 8, according to certain embodiments of this disclosure, the bent portion 203 may be defined between one edge of the first electrode 211 and one edge of the second electrode 221, which are adjacent to each other, and the dust collecting sheet 200 may be bent based on the slits S formed in the central portion between the first electrode 211 and the second electrode 221 to define the first flat surface 201, the bent portion 203, and the second flat surface 202.

In addition, the slit S formed along a width (a direction Z of FIG. 8) of the dust collecting sheet 200 may include a plurality of through holes T that are formed at a predetermined interval. The through holes T may be holes formed through a portion between the first electrode 211 and the second electrode 221 of the dust collecting sheet 200 and may be formed with a predetermined height and width via die-cut.

According to certain embodiments, through hole T may be a hole through a separate bending member (not shown) may be inserted to support the bent portion 203 and to uniformly bend the plurality of bent portions 203 at a predetermined interval during a bending procedure of the dust collecting sheet 200 in a spread state and may extend in a width direction of the dust collecting sheet 200. With regard to the through hole T, a bending member configured with a height corresponding to a height of the through hole T may be inserted into the through hole T and, accordingly, the dust collecting sheet 200 may be bent in a zigzag form in a state in which the bent portion 203 prior to bending is supported.

For example, the dust collecting sheet 200 in a spread state prior to bending may be bent at a predetermined interval in a zigzag form by inserting a plurality of bending members corresponding to the plurality of bent portions 203 into the plurality of through holes T and, then, applying external force to the dust collecting sheet 200 through the plurality of bending members.

According to certain embodiments of this disclosure, the bent portion 203 may be formed to correspond to the height of the through hole T and the bent portion 203 may be defined between upper and lower ends of the through hole T. However, bending of the dust collecting sheet 200 may be performed to define the first flat surface 201 and the second flat surface 202 to face each other and the height of the bent portion 203 and the height of the first and second flat surfaces 201 and 202 may be changed in various ways.

The plurality of support members 2101 and 2201 of the aforementioned first and second covers 21 and 22 may be inserted into the plurality of through holes T while the dust collecting sheet 200 is bent to stably support the dust collecting sheet 200 inside the first and second covers 21 and 22.

Figure 9:
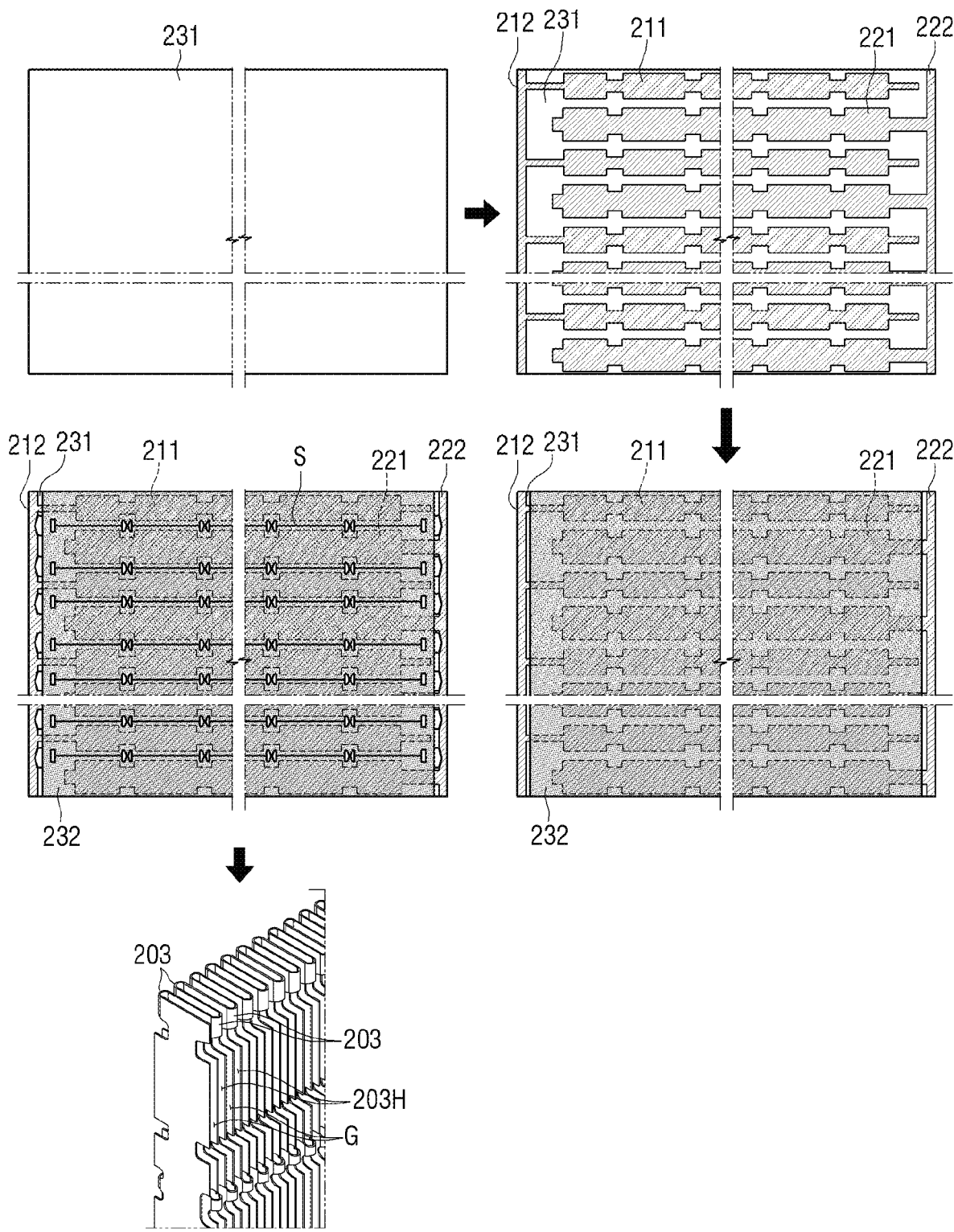
FIG. 9 illustrates a method of a manufacturing a dust collecting sheet, including the sheet shown in FIG. 6, according to certain embodiments of this disclosure, including the sheet shown in FIG. 6.
Figure 10:
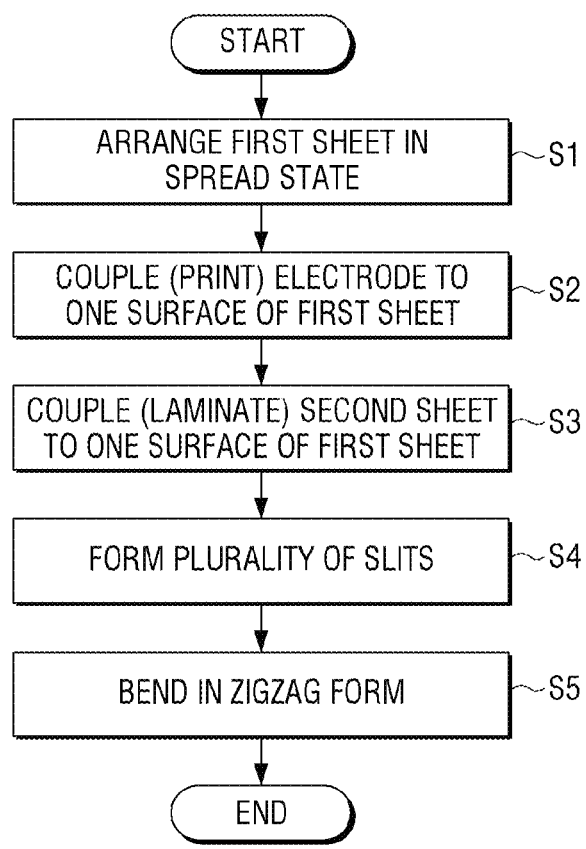
FIG. 10 illustrates, in flowchart format, operations of a method of manufacturing a dust collecting sheet according to certain embodiments of this disclosure, including the dust collecting sheet shown in FIG. 9.

FIG. 9 illustrates a method of manufacturing a dust collection sheet, including the dust collecting sheet 200 shown in FIG. 6, according to certain embodiments of this disclosure. FIG. 10 illustrates, in flowchart format, operations of a method of manufacturing a dust collecting sheet, for example, dust collection sheet 200 shown in FIG. 9 according to some embodiments of this disclosure.

Hereinafter, the method of manufacturing the dust collecting sheet 200 will be described with reference to the non-limiting examples shown in FIGS. 9 and 10.

First, the first sheet 231 in a spread state may be arranged (S1).

The first sheet 231 may be formed of a plastic film, or a transparent insulating material, for example, a polyethylene terephthalate (PET) film.

Then, the plurality of first and second electrodes 211 and 221 may be coupled to one surface of the first sheet 231 (S2).

As described above, the plurality of first and second electrodes 211 and 221 may be coupled to the first sheet 231 by printing one surface of the first sheet 231 with conductive carbon ink or depositing aluminum on one surface of the first sheet 231. Thereby, the plurality of first and second electrodes 211 and 221 configured with a conductive pattern formed on one surface of the first sheet 231.

According to certain embodiments, the first and second power connectors 212 and 222 for supplying power to the plurality of first and second electrodes 211 and 221 may also be formed on one surface of the first sheet 231 using the same method as that of the first and second electrodes 211 and 221 during a procedure of forming the plurality of first and second electrodes 211 and 221 via printing or deposition.

When the plurality of first and second electrodes 211 and 221 are coupled to one surface of the first sheet 231, a plurality of electrode patterns may be printed in parallel to one surface of the first sheet 231 without discrimination between the first electrode 211 and the second electrode 221 and different polarities may be applied to facing electrode patterns among a plurality of electrode patterns in the future and, accordingly, a first electrode as a high-voltage electrode and a second electrode as a low-voltage electrode may be configured.

In some embodiments, the plurality of first and second electrodes 211 and 221 and the first and second power connectors 212 and 222 may be formed with a conductive pattern by printing one surface of the first sheet 231 with carbon ink or depositing aluminum on one surface of the first sheet 231 and, accordingly, the plurality of first and second electrodes 211 and 221 may be easily and rapidly formed with various types and shapes.

Then, the second sheet 232 may be coupled to one surface of the first sheet 231, on which the plurality of first and second electrodes 211 and 221 are arranged (S3).

The second sheet 232 may be a film formed of the same material as the first sheet 231 and may be laminated to one surface of the first sheet 231 via adhesives or the like and, accordingly, the first sheet 231 and the second sheet 232 may be integrally coupled to form one sheet of the dust collecting sheet 200.

Thereby, the plurality of first electrodes 211 and the plurality of second electrodes 221 may be alternately arranged in the dust collecting sheet 200 and the dust collecting sheet 200 may be bent in a zigzag form to configure the dust collector 20 onto which charged pollutants are adsorbed.

As described above, a width of the second sheet 232 may be smaller than a width of the first sheet 231 and, accordingly, the first and second power connectors 212 and 222 arranged on one surface of the first sheet 231 may be externally exposed.

Then, the plurality of slits S may be formed between the plurality of first electrodes 211 and the plurality of second electrodes 221 (S4).

As described above, the plurality of slits S may be formed by cutting a portion between the plurality of first electrodes 211 and the plurality of second electrodes 221 of the dust collecting sheet 200 in a longitudinal direction of the first and second electrodes 211 and 221, i.e., a width direction of the dust collecting sheet 200.

In addition, the plurality of through holes T may be formed during formation of the plurality of slits S.

Then, the dust collecting sheet 200 may be bent in a zigzag form in such a way that the plurality of first electrodes 211 and the plurality of second electrodes 221 face each other (S5).

The dust collecting sheet 200, including the plurality of slits S formed therein may, according to certain embodiments, be bent in a zigzag form with respect to the plurality of slits S to form the plurality of bent portions 203 and, accordingly, the plurality of first and second flat surfaces 201 and 202 may be formed in such a way that the plurality of first electrodes 211 and the plurality of second electrodes 221 face each other and the gap G through which air passes may be defined between the plurality of first flat surfaces 201 and the plurality of second flat surfaces 202.

In addition, the dust collecting sheet 200 may be bent in a zigzag form with respect to the plurality of slits S and, accordingly, the plurality of slits S may be widened to form the openings 203H on the plurality of bent portions 203.

According to certain embodiments, air passing through the charger 10 may pass between the plurality of first electrodes 211 and the plurality of second electrodes 221 of the dust collecting sheet 200 and charged pollutants may be adsorbed onto a surface of the second flat surface 202 including the second electrode 221 formed therein by an electric field between the first electrode 211 and the second electrode 221.

As such, the dust collector 20 including the dust collecting sheet 200 according to at least one embodiment of the present disclosure may be configured in such a way that the plurality of first and second electrodes 211 and 221 are formed with an electrode pattern by printing one surface of the first sheet 231 with carbon ink or depositing metal on one surface of the first sheet 231, the plurality of slits S are formed in the dust collecting sheet 200 in a spread state and, then, the dust collecting sheet 200 is bent in a zigzag form and, accordingly, the dust collecting sheet 200 for externally discharging air purified by adsorbing pollutant in air introduced from the charger 10 maybe easily manufactured via only a simple process.

According to certain embodiments, a manufacturing process of a dust collecting sheet 200 may be simplified and a structure of a dust collecting sheet 200 may also be simplified, thereby reducing manufacturing costs and manufacturing expenses of the dust collecting sheet 200 compared with the prior art.

Figure 11:
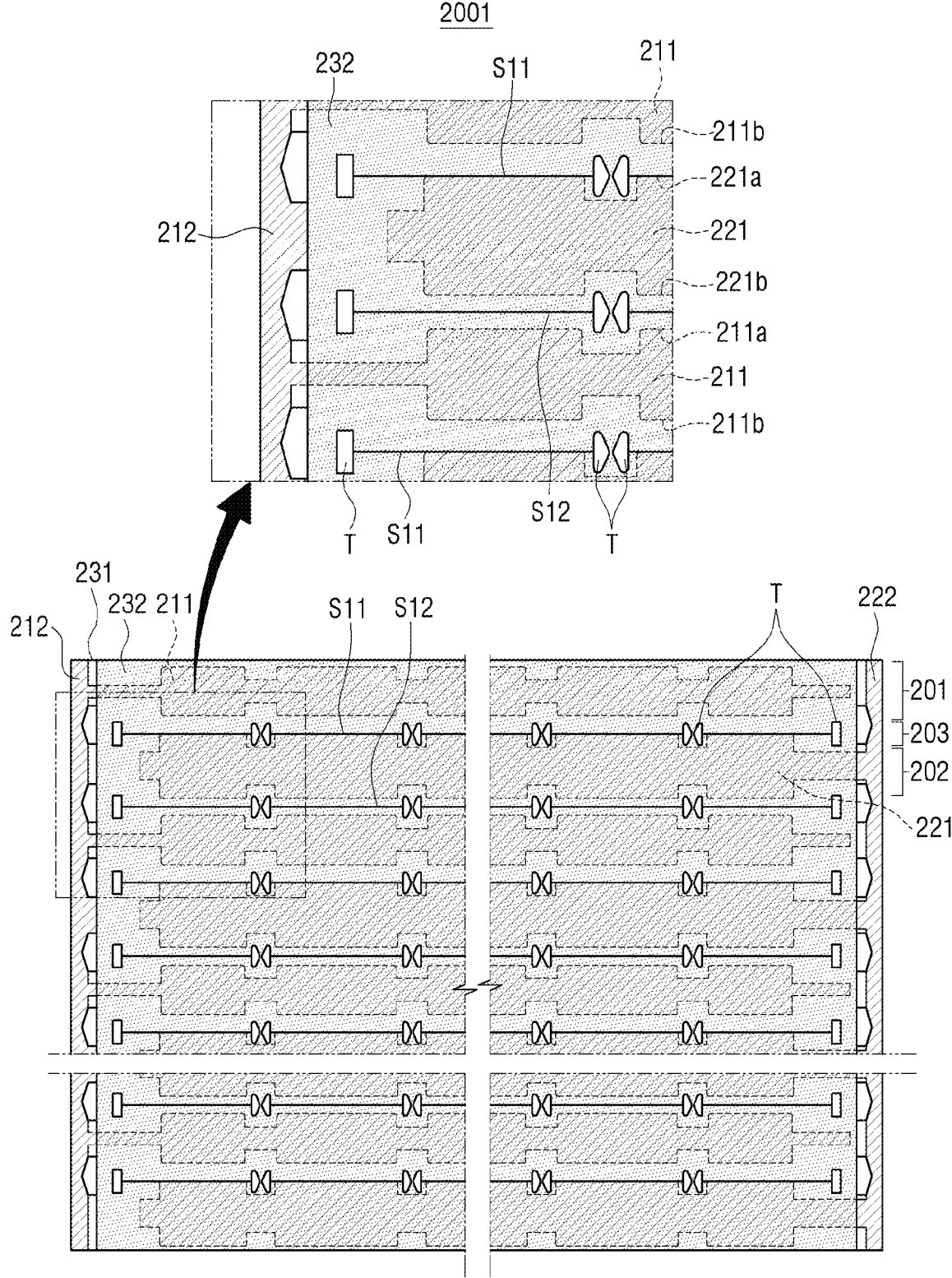
FIG. 11 illustrates a dust collecting sheet according to certain embodiments of this disclosure, such as a modified example of the dust collecting sheet shown in FIG. 8.
Figure 12:
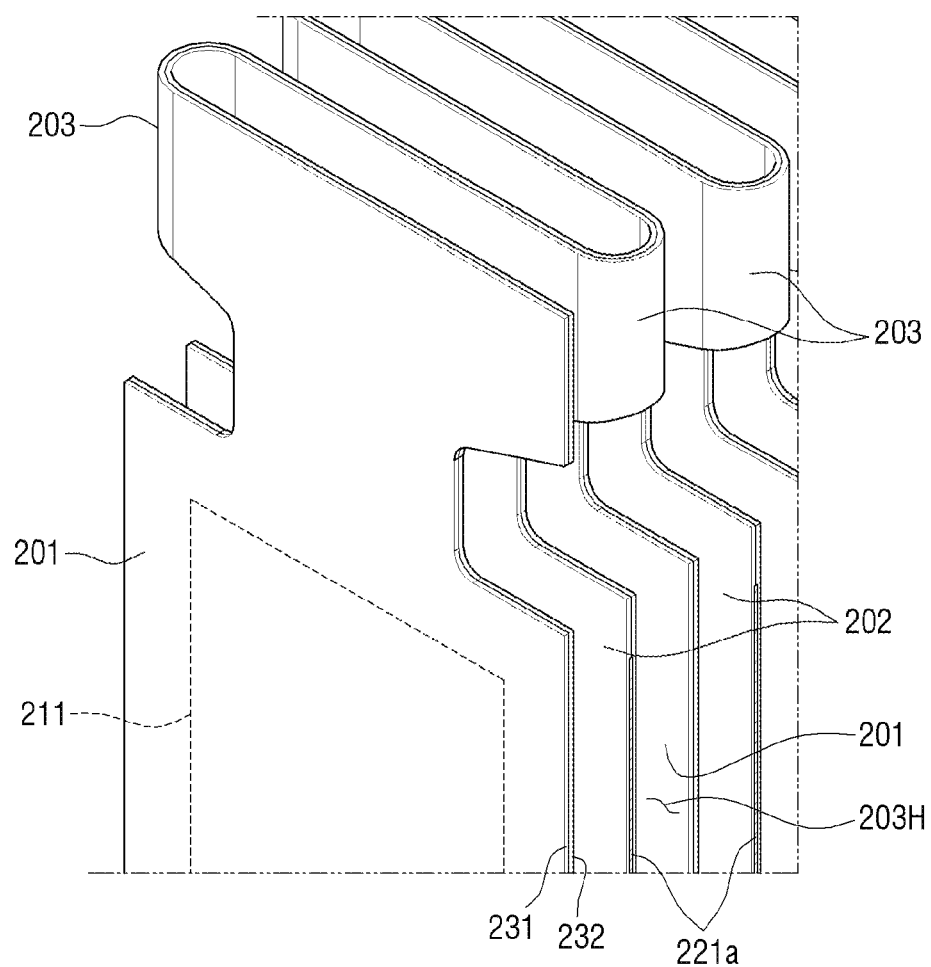
FIG. 12 illustrates a dust collecting sheet according to certain embodiments of this disclosure, including when the sheet shown in FIG. 11 is bent.

FIG. 11 is a diagram showing a modified example of the dust collecting sheet shown in FIG. 8 and FIG. 12 is an enlarged perspective view showing a case after a dust collecting sheet 2001 shown in FIG. 11 is bent.

Hereinafter, FIGS. 11 and 12 illustrate a dust collecting sheet according to certain embodiments of this disclosure, including a modified example of the dust collecting sheet 2001. According to certain embodiments, the dust collecting sheet 2001 shown in the non-limiting example of FIGS. 11 and 12 may have the same or similar structure as the dust collecting sheet 200 shown in FIGS. 6 to 8 and, thus, a repeated description will be omitted herein.

As shown in the non-limiting example of FIG. 12, the plurality of second electrodes 221 arranged in the plurality of the second flat surfaces 202, respectively, may be partially exposed to the outside. Thereby, charged pollutants may be continuously adsorbed onto a surface of the second flat surface 202 and electric charges of the pollutants may accumulate and, accordingly, a voltage difference between the first electrode 211 and the second electrode 221 may be reduced to prevent dust collecting performance from being degraded.

For example, when pollutants that are charged with plus polarity through the charger 10 are adsorbed onto a surface of the second flat surface 202 including the second electrode 221 formed therein as a minus electrode and the electronic dust collecting apparatus 1 is operated in the long term, pollutants charged with plus polarity may accumulate on the second flat surface 202, thereby lowering a voltage difference between the second electrode 221 as a minus electrode and the first electrode 211 as a plus electrode.

Accordingly, the second electrode 221 may be partially exposed outside the dust collecting sheet 200 and, thus, electric charges accumulating on the second electrodes 221 may be externally discharged.

As shown in FIG. 11, in some embodiments, the dust collecting sheet 2001 may include the first sheet 231 and the second sheet 232 laminated to the first sheet 231 and the plurality of first electrodes 211 and the plurality of second electrodes 221 may be arranged in the dust collecting sheet 2001.

The dust collecting sheet 2001 may include a first slit S11 that is formed along a one-side edge 221a of the second electrode 221 to externally expose one-side edge 221a of the second electrode 221 and may also include a second slit S12 formed in a central portion between the other-side edge 221b opposite to the one-side edge 221a of the second electrode 221 and one-side edge 211a of the first electrode 211 adjacent thereto.

According to certain embodiments, a plurality of first slits S11 and a plurality of second slits S12 may be formed and may be alternately formed between the plurality of first electrodes 211 and the plurality of second electrodes 221.

As shown in the non-limiting example of FIG. 12, when the dust collecting sheet 2001 is bent in a zigzag form with respect to the plurality of first slits S11 and the plurality of second slits S12, the plurality of first slits S11 and the plurality of second slits S12 may be widened to form the openings 203H.

In addition, as the openings 203H are formed from the first slits S11, the one-side edge 221a of the second electrode 221 may be externally exposed on an end portion of the second flat surface 202.

In addition, the plurality of first electrodes 211 and the plurality of second electrodes 221 may be formed of a material with an electric resistance of approximately $10^7$ $\Omega\cdot$cm or more to prevent electric charges from accumulating on the second electrode 221 without dielectric breakdown due to voltage application.

In some embodiments, the one-side edge 221a of the second electrode 221 may be exposed outside the dust collecting sheet 2001 through the first slit S11 to easily remove electric charges accumulating on the second electrode 221, thereby preventing dust collecting performance of the dust collector 20 from being degraded along with a long-term operation.

Figure 13:
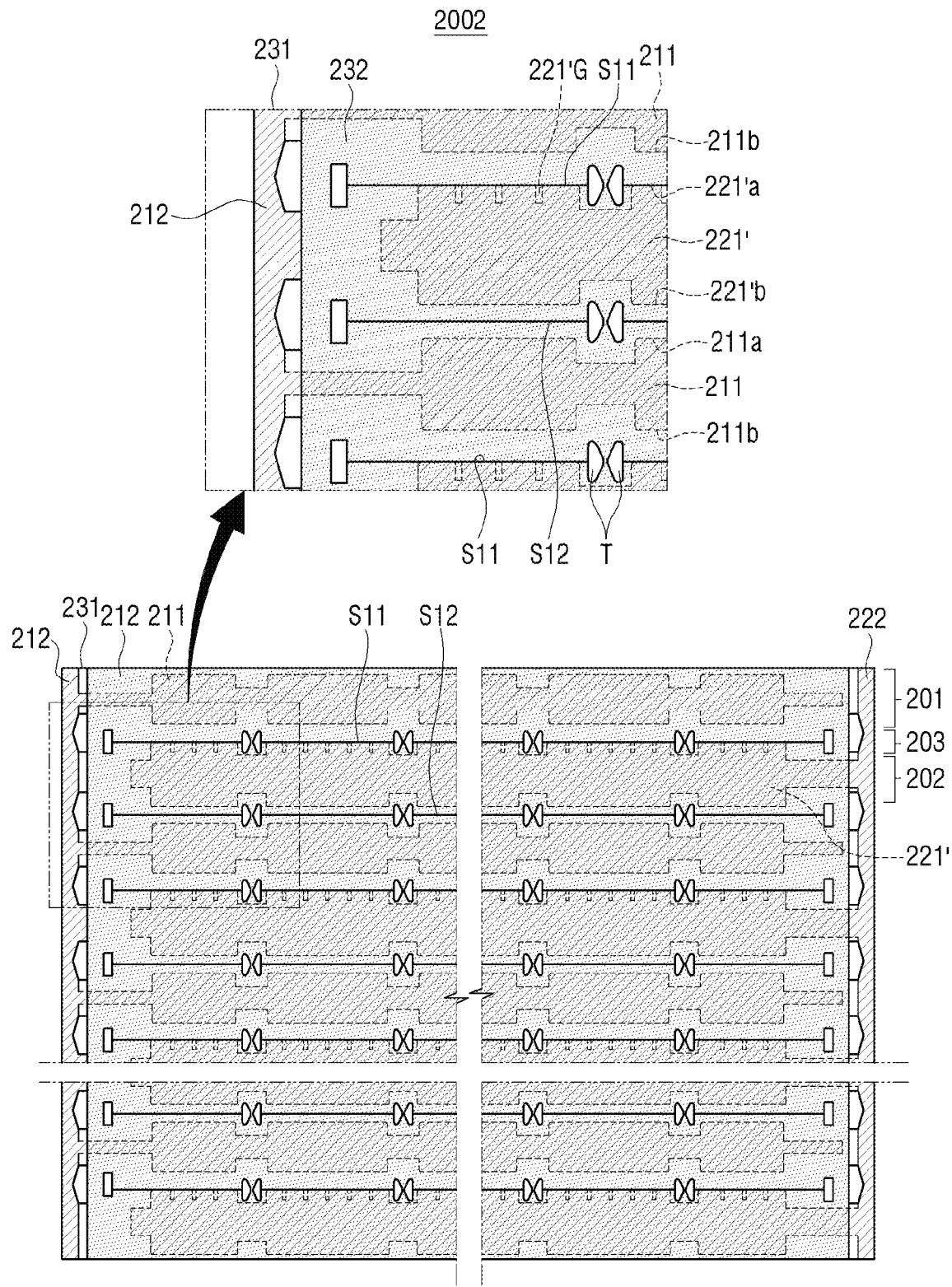
FIG. 13 illustrates a dust collecting sheet according to certain embodiments of this disclosure, such as a modified example of the dust collecting sheet shown in FIG. 8.
Figure 14:
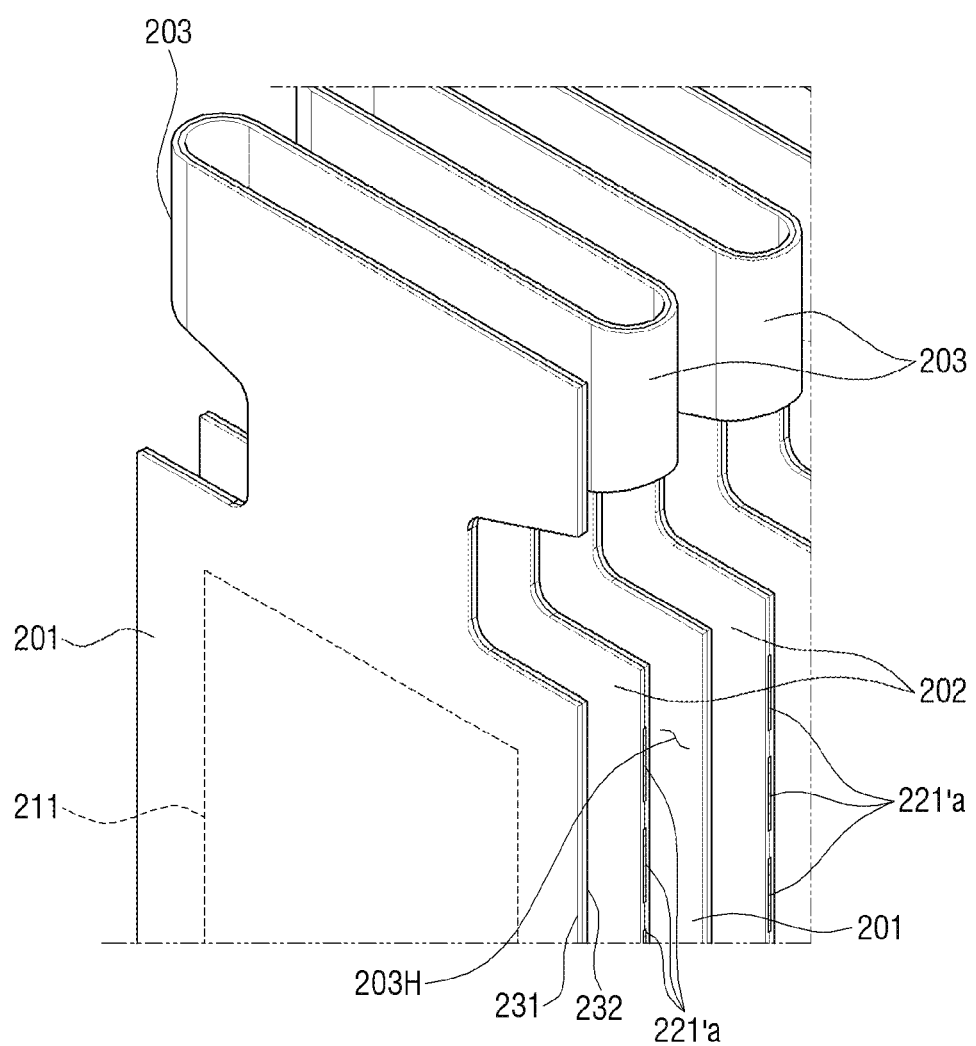
FIG. 14 is an enlarged perspective view of a case after a dust collecting sheet shown in FIG. 13 is bent.

FIG. 13 illustrates a dust collecting sheet according to certain embodiments of this disclosure, such as modifications of the dust collecting sheet shown in FIG. 8. FIG. 14 illustrates a dust collecting sheet according to certain embodiments, including an enlarged perspective view of the case after the dust collecting sheet 2002 shown in FIG. 13 is bent during construction.

A non-limiting example of the dust collecting sheet 2002 will be described with reference to FIGS. 13 and 14. However, the dust collecting sheet 2002 shown in FIGS. 13 and 14 may have the same or similar structure as the dust collecting sheet 2001 shown in FIGS. 11 and 12 and, thus, a repeated description will be omitted herein.

As shown in the non-limiting example of FIG. 13, the dust collecting sheet 2002 may include the first sheet 231 and the second sheet 232 laminated to the first sheet 231 and the plurality of first electrodes 211 and a plurality of second electrodes 221' may be arranged in the dust collecting sheet 2002.

According to certain embodiments, the dust collecting sheet 2002 may include the first slit S11 that is formed along the one-side edge 221'a of the second electrode 221' to externally expose one-side edge 221'a of a second electrode 221' and may also include the second slit S12 formed in a central portion between the other-side edge 221'b opposite to the one-side edge 221'a of the second electrode 221' and the one-side edge 211a of the first electrode 211 adjacent thereto.

The plurality of first slits S11 and the plurality of second slits S12 may be formed and may be alternately formed between the plurality of first electrodes 211 and the plurality of second electrodes 221'.

The plurality of second electrodes 221' may include a plurality of grooves 221'G that are concave from the one-side edge 221'a. The plurality of grooves 221'G may be a concave groove formed toward an internal side of the second electrode 221' from the one-side edge 221'a of the second electrode 221' and even if the dust collecting sheet 2002 is cut due to the first slits S11, the first sheet 231 and the second sheet 232 may be maintained to be laminated to each other via adhesives in the plurality of grooves 221'G.

According to certain embodiments, even if the first slits S11 are widened to form the openings 203H via bending of the dust collecting sheet 2002, the first sheet 231 and the second sheet 232 corresponding to portions of the plurality of grooves 221'G and, accordingly, the first sheet 231 and the second sheet 232 may be prevented from being separated or detached during a bending procedure of the dust collecting sheet 2002.

As shown in the non-limiting example of FIG. 14, when the dust collecting sheet 2002 is bent in a zigzag form to form the plurality of bent portions 203, the one-side edge 221'a of the second electrode 221' may be externally exposed on an end portion of the second flat surface 202.

As such, the one-side edge 221'a of the second electrode 221' may be exposed outside the dust collecting sheet 2002 through the first slits S11 to easily remove electric charges accumulating on the second electrode 221', thereby preventing dust collecting performance of the dust collector 20 from being degraded along with long term operation.

In some embodiments, the second electrode 221' may include the plurality of grooves 221'G that are concave from the one-side edge 221'a and, accordingly, the one-side edge 221'a of the second electrode 221', which is externally exposed on an end portion of the second flat surface 202, may be shaped like discontinuous lines. In addition, the first sheet 231 and the second sheet 232 are maintained to be laminated to each other between the discontinuous lines of the one-side edge 221'a of the second electrode 221', which is externally exposed on an end portion of the second flat surface 202 and, accordingly, the first sheet 231 and the second sheet 232 may be maintained to be fixedly coupled to each other.

Figure 15:
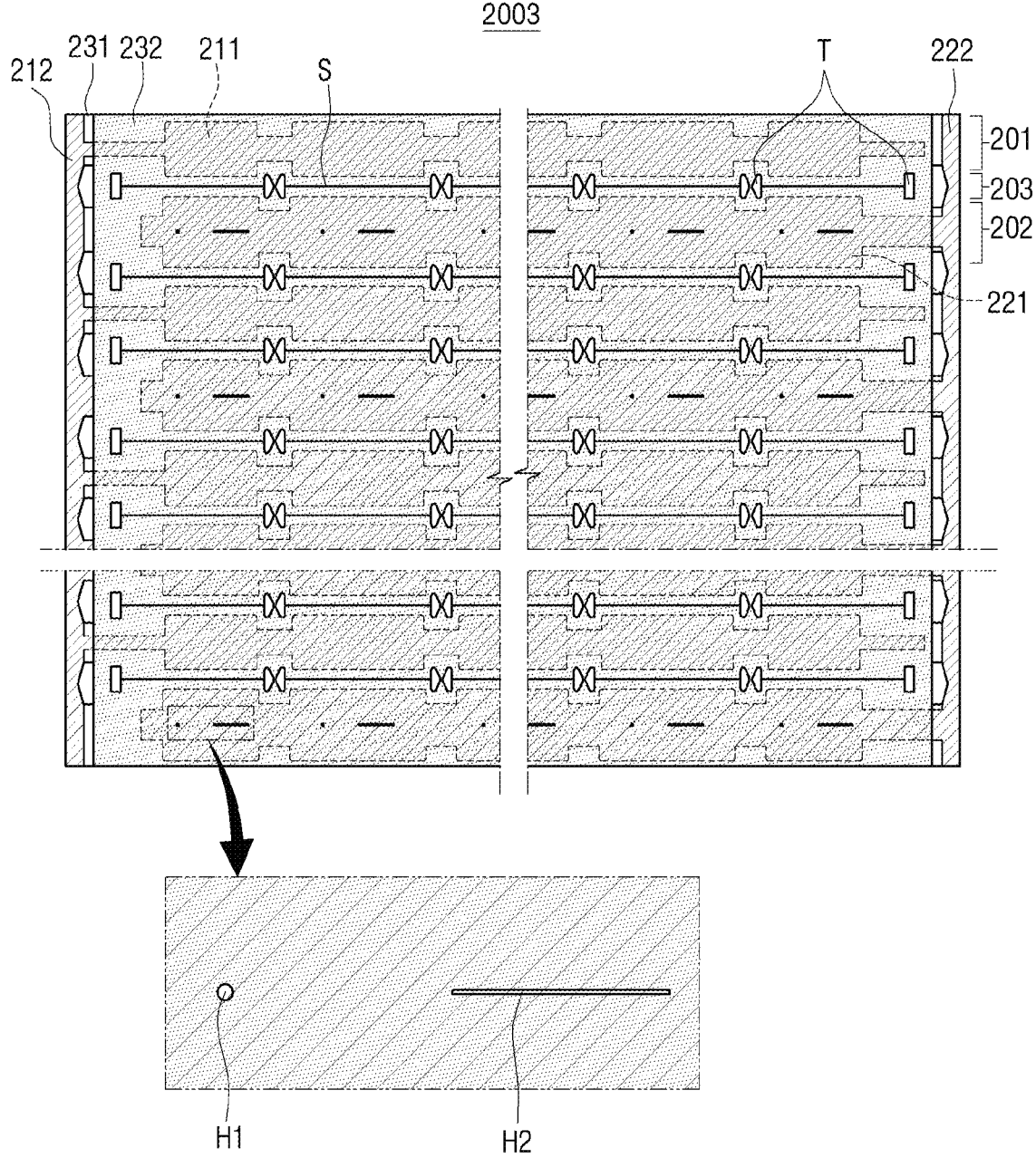
FIG. 15 illustrates a dust collecting sheet according to certain embodiments of this disclosure, including a modification of the dust collecting sheet shown in FIG. 8.

FIG. 15 illustrates a dust collecting sheet according to certain embodiments of this disclosure, including a modification of the dust collecting sheet shown in FIG. 8.

Hereinafter, another modified example of a dust collecting sheet 2003 will be described with reference to FIG. 15. However, the dust collecting sheet 2003 shown in FIG. 15 may have the same or similar structure as the dust collecting sheet 200 shown in FIGS. 6 to 8 and, thus, a repeated description will be omitted herein.

As shown in the non-limiting example of FIG. 15, the dust collecting sheet 2003 may include at least one of a plurality of through holes H1 or a plurality of through slits H2 through which the second electrode 221 is externally exposed.

The plurality of through holes H1 and the plurality of through slits H2 may be formed in the second flat surface 202 and, accordingly, portions of the second electrode 221, which correspond to the through holes H1 and the through slits H2, may be exposed outside the dust collecting sheet 2003.

According to some embodiments, electric charges accumulating on the second electrode 221 may be exposed outside the dust collecting sheet 2003 through the plurality of through holes H1 and the plurality of through slits H2, thereby preventing dust collecting performance of the dust collector 20 from being degraded along with long term operation.

The plurality of through holes H1 and the plurality of through slits H2 may be formed through the dust collecting sheet 2003 or may be formed on only one of the first sheet 231 or the second sheet 232.

In addition, the plurality of through holes H1 and the plurality of through slits H2 formed through the dust collecting sheet 2003 may be formed while the slit S is formed in the dust collecting sheet 2003 that is in a spread state and includes the plurality of first electrodes 211 and the plurality of second electrodes 221 formed therein, thereby simplifying a manufacturing process. In this case, the plurality of through holes H1 and the plurality of through slits H2 may be formed through the second electrode 221.

Figure 16:
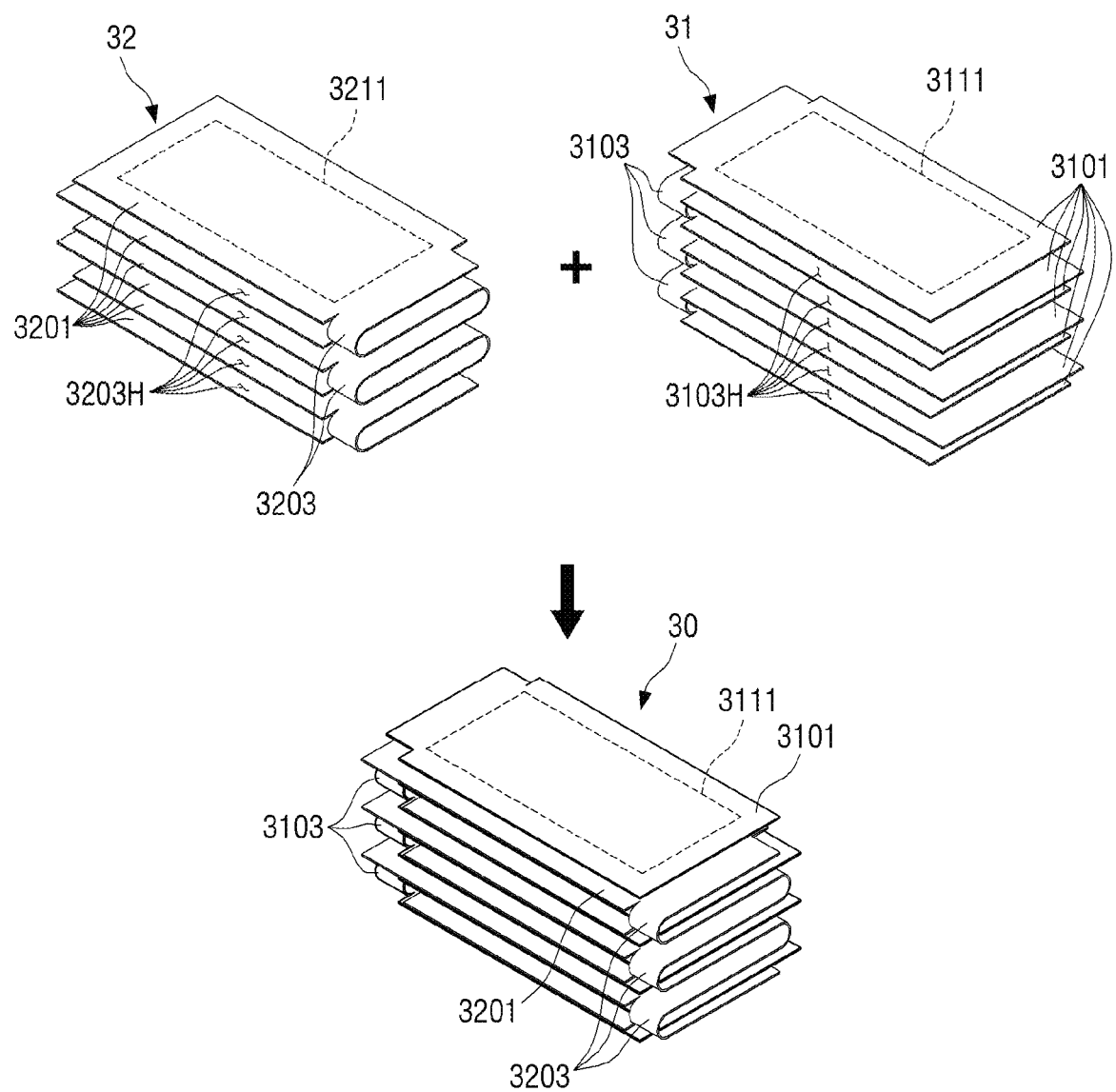
FIG. 16 illustrates a dust collector according to some embodiments of the present disclosure.

FIG. 16 illustrates, in perspective view, a dust collector 30 according to certain embodiments of the present disclosure.

Hereinafter, the dust collector 30 according to some embodiments of the present disclosure will be described with reference to the non-limiting example of FIG. 16. However, with regard to a description of the dust collector 30 shown in FIG. 16, a repeated description of the same or similar structure as the dust collecting sheet 200 shown in FIG. 6 will be omitted herein.

In the non-limiting example of FIG. 16, dust collector 30 may include a first dust collecting sheet 31 and a second dust collecting sheet 32 and the first dust collecting sheet 31 and the second dust collecting sheet 32 may be alternately arranged in an interdigital structure as shown in FIG. 16. In addition, the first and second dust collecting sheets 31 and 32 may be coupled to separate first and second covers (not shown).

The first dust collecting sheet 31 may include a plurality of first electrodes 3111 that are arranged therein in parallel to each other. The first dust collecting sheet 31 may include a first sheet and a second sheet laminated to the first sheet and the plurality of first electrodes 3111 may be configured with a conductive pattern printed or deposited on one surface of the first sheet.

According to certain embodiments, first dust collecting sheet 31 may include a plurality of first bent portions 3103 that are formed via bending of the first dust collecting sheet 31 in a zigzag form between the plurality of first electrodes 3111.

The first dust collecting sheet 31 may include a plurality of first flat surfaces 3101 that are formed to face each other via bending of the first dust collecting sheet 31 in a zigzag form and the plurality of first bent portions 3103 may connect the two first flat surfaces 3101 that are arranged to face other between the plurality of first flat surfaces 3101.

Since the plurality of first electrodes 3111 are arranged in the plurality of first flat surfaces 3101, respectively, the plurality of first flat surfaces 3101 may face each other and, accordingly, the plurality of first electrodes 3111 may also be arranged to face each other.

The first dust collecting sheet 31 may include a plurality of openings 3103H that are formed in the plurality of first bent portions 3103, respectively. The plurality of openings 3103H may be formed by forming slits in the first dust collecting sheet 31 in a spread state and, then, bending the first dust collecting sheet 31 in a zigzag form.

In some embodiments, openings 3103H formed in the first bent portions 3103 may be formed in a width direction of the first dust collecting sheet 31 and the openings 3103H may extend to one-side edge of the first dust collecting sheet 31. For example, as shown in FIG. 16, a right end of the first dust collecting sheet 31 may be open by the plurality of openings 3103H and the plurality of first bent portions 3103 may be formed only at a left end of the first dust collecting sheet 31.

The second dust collecting sheet 32 may be a structure that is symmetrical with the aforementioned structure of the first dust collecting sheet 31 and may include components, most of which are similar to the first dust collecting sheet 31.

The second dust collecting sheet 32 may include a plurality of second electrodes 3211 that are arranged therein in parallel to each other. The second dust collecting sheet 32 may include a first sheet and a second sheet laminated to the first sheet and the plurality of second electrodes 3211 may be configured with a conductive pattern printed or deposited on one surface of the first sheet.

The second dust collecting sheet 32 may, in some embodiments, include a plurality of second bent portions 3203 that are formed by bending the second dust collecting sheet 32 in a zigzag form between the plurality of second electrodes 3211.

The second dust collecting sheet 32 may include a plurality of second flat surfaces 3201 that are formed by bending the second dust collecting sheet 32 in a zigzag form to face each other and the plurality of second bent portions 3203 may connect the two facing second flat surfaces 3201 arranged between the plurality of second flat surfaces 3201.

Since the plurality of second electrodes 3211 are arranged in the plurality of second flat surfaces 3201, respectively, the plurality of second flat surfaces 3201 may face each other and, accordingly, the plurality of second electrodes 3211 may also be arranged to face each other.

In certain embodiments, the second dust collecting sheet 32 may include a plurality of openings 3203H formed in the plurality of second bent portions 3203, respectively. The plurality of openings 3203H may be formed by forming slits in the second dust collecting sheet 32 in a spread state and, then, bending the second dust collecting sheet 32 in a zigzag form.

The openings 3203H formed in the second bent portions 3203 may formed in a width direction of the second dust collecting sheet 32 and may extend to one-side edge of the second dust collecting sheet 32. For example, as shown in the non-limiting example of FIG. 16, a left end of the second dust collecting sheet 32 may be open by the plurality of openings 3203H and the plurality of second bent portions 3203 may be formed only on a right end of the second dust collecting sheet 32.

The first dust collecting sheet 31 and the second dust collecting sheet 32 which, in some embodiments, are configured as separate sheets may be coupled to each other as an interdigital structure to configure the dust collector 30 in such a way that the plurality of first electrodes 3111 and the plurality of second electrodes 3211 face each other.

In certain embodiments, one end of the first dust collecting sheet 31, adjacent to the second dust collecting sheet 32, may be open by the openings 3103H and one end of the second dust collecting sheet 32, adjacent to the first dust collecting sheet 31, may be open by the openings 3203H.

Thereby, the first dust collecting sheet 31 and the second dust collecting sheet 32 may be coupled to each other to insert the plurality of second electrodes 3211 between the plurality of first electrodes 3111 that face each other. Accordingly, the plurality of first electrodes 3111 and the plurality of second electrodes 3211 may alternately face each other.

The first electrodes 3111 of the first dust collecting sheet 31 may, in some embodiments, be configured as a high-voltage electrode and the second electrodes 3211 of the second dust collecting sheet 32 may be configured as a low-voltage electrode with a lower voltage than in the first electrodes 3111.

In addition, power of plus polarity may be applied to the plurality of first electrodes 3111 and power of minus polarity may be applied to the plurality of second electrodes 3211 to form an electric field between the first electrodes 3111 and the second electrodes 3211.

Accordingly, pollutants that are charged with plus polarity while passing through the charger 10 may be adsorbed onto the second flat surfaces 3202 including the second electrodes 3211 formed therein as a minus electrode while passing between the first flat surfaces 3101 and the second flat surfaces 3202.

As such, the first dust collecting sheet 31 including the plurality of high-voltage electrodes 3111 formed therein and the second dust collecting sheet 32 including the plurality of low-voltage electrodes 3211 formed therein may be separately configured and, thus, the characteristics of the plurality of first electrodes 3111 and the plurality of second electrodes 3211 may be easily changed as necessary and the plurality of first electrodes 3111 and the plurality of second electrodes 3211 may be applied to the dust collector 30.

Figure 17:
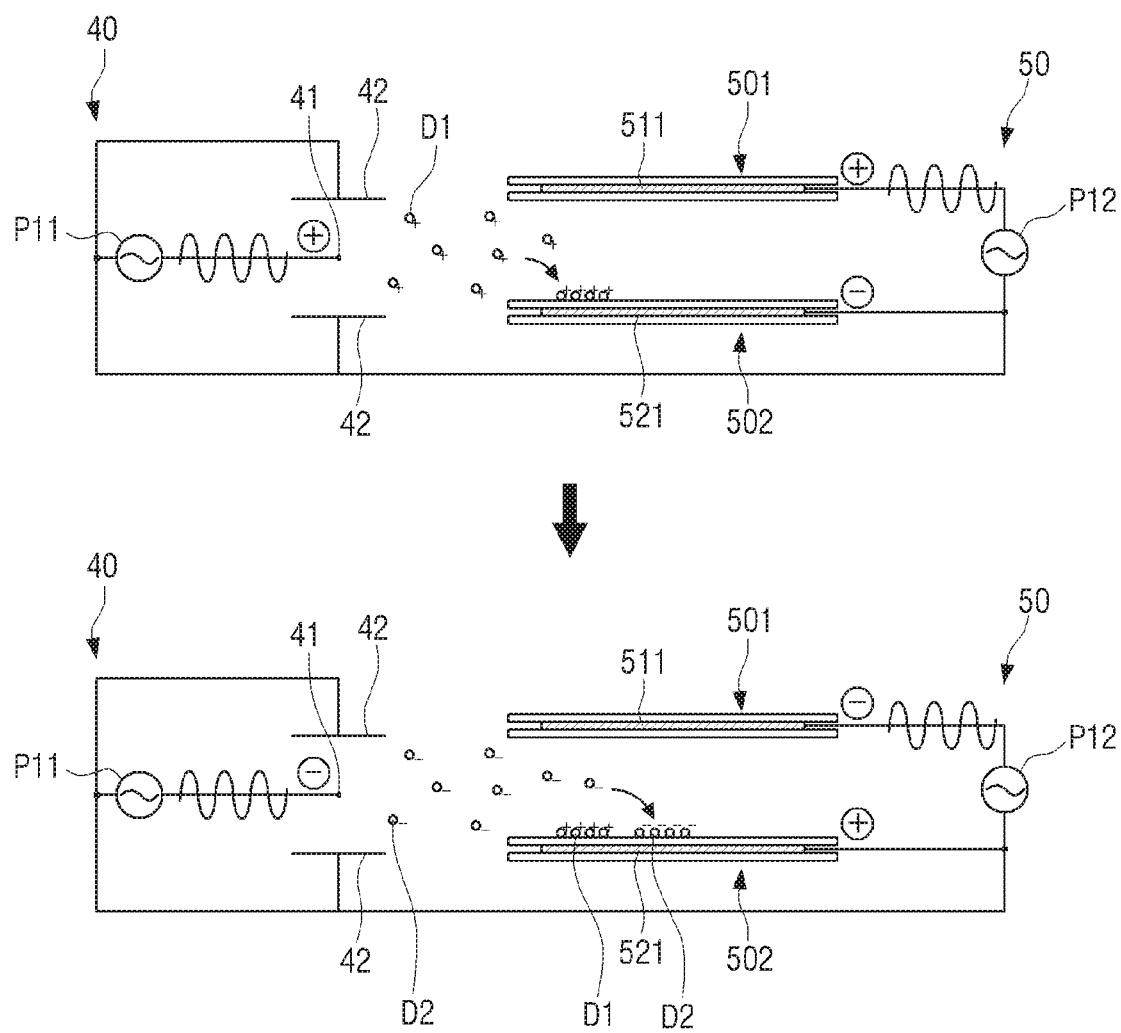
FIG. 17 is a schematic diagram showing a concept of an electronic dust collecting apparatus according to another embodiment of the present disclosure.

FIG. 17 illustrates an electronic dust collecting apparatus 1' according to certain embodiments of the present disclosure.

Hereinafter, the electronic dust collecting apparatus 1' according to at least one embodiment of the present disclosure will be described with reference to FIG. 17. However, the electronic dust collecting apparatus 1' shown in FIG. 17 may, in some embodiments, have the same or similar structure as the electronic dust collecting apparatus 1 according to an embodiment of the present disclosure shown in FIGS. 2 and 3 and, thus, a repeated description will be omitted herein.

The electronic dust collecting apparatus 1' may include a charger 40 and a dust collector 50.

The charger 40 may include a plurality of discharge electrodes 41 and a plurality of corresponding electrodes 42 and the discharge electrodes 41 may be arranged between a pair of corresponding electrodes 42. Accordingly, when a predetermined voltage is applied to the discharge electrodes 41 and the corresponding electrodes 42, corona discharge may occur between one discharge electrode 41 and a pair of corresponding electrodes 42, thereby charging pollutants passing through the charger 40.

The dust collector 50 coupled to face the charger 40 may include a dust collecting sheet formed by continuously bending one sheet. The dust collecting sheet may have components, most of which are similar to the dust collecting sheet 200 shown in FIG. 6.

The dust collecting sheet may, according to certain embodiments, include a plurality of bent portions formed by continuously bending the dust collecting sheet in a zigzag form and may include a plurality of first electrodes 511 and a plurality of second electrodes 521 that are alternately arranged therein.

The dust collecting sheet may include a plurality of first flat surfaces 501 and a plurality of second flat surfaces 502 that are arranged to face each other at a predetermined interval via bending, the first electrodes 511 may be arranged on the first flat surfaces 501, and the second electrodes 521 may be arranged on the second flat surfaces 502 and, accordingly, the plurality of first electrodes 511 and the plurality of second electrodes 521 that are alternately arranged in a dust collecting sheet 500 may be arranged to face each other.

As shown in the non-limiting example of FIG. 17, a first power source P11 may be connected to the discharge electrodes 41 of the charger 40 to apply a high voltage to the discharge electrodes 41 and a second power source P12 may be connected to the first electrodes 511 of the dust collector 50 to apply a high voltage to the first electrodes 511.

In addition, a high voltage of plus polarity may be applied to the discharge electrodes 41 through the first power source P11 to cause corona discharge between the discharge electrodes 41 and the corresponding electrodes 42, thereby charging pollutants D1 contained in air with plus polarity.

The dust collector 50 may apply a high voltage of plus polarity to the first electrodes 511 through the second power source P12 to charge the second electrodes 521 facing the first electrodes 511 with minus polarity and may allow the pollutants D1 charged with plus polarity while passing through the charger 40 to be adsorbed onto the second flat surfaces 502 including the second electrodes 521 formed therein.

In addition, when the pollutants D1 charged with plus polarity accumulate on the second flat surfaces 502 for a predetermined time via an operation of the electronic dust collecting apparatus 1', the first power source P11 and the second power source P12 may convert a plus polarity voltage applied to the discharge electrodes 41 and the first electrodes 511 into a minus polarity-voltage.

In detail, the first power source P11 that has applied a high voltage of plus polarity to the discharge electrodes 41 may apply a high-voltage of minus polarity to the discharge electrodes 41, thereby charging pollutants D2 included in air with minus polarity.

In addition, the second power source P12 that has applied a high voltage of plus polarity to the first electrodes 511 may apply a high voltage of minus polarity to the first electrodes 511 to allow the pollutants D2 charged with minus polarity to be adsorbed onto the second flat surfaces 502 including the second electrodes 521 therein with plus polarity.

Accordingly, plus electric charges that accumulate on the second electrodes 521 due to the pollutants D1 that previously accumulate on the second flat surfaces 502 may be neutralized by minus electric charges of the pollutants D2 that are charged with minus polarity by converting electrodes of the first and second power sources P11 and P12.

Then, when the pollutants D2 charged with minus polarity accumulate on the second flat surfaces 502 and minus electric charges accumulate on the second electrodes 521, a high voltage of plus polarity may be re-applied to the discharge electrodes 41 and the first electrodes 511 from the first and second power sources P11 and P12 to neutralize minus electric charges accumulating on the second electrodes 521.

As such, polarities of power supplied from the first and second power sources P11 and P12 may be periodically reversed to neutralize electric charges accumulating on the second electrodes 521 and, accordingly, electric charges may accumulate on the second electrodes 521 to prevent dust collecting performance of the dust collector 50 from being degraded.

The aforementioned first and second power sources P11 and P12 may include power sources for supplying alternating current (AC) and may adjust a frequency of the applied AC through a converter (not shown) to automatically adjust a period for neutralizing electric charges accumulating on the second electrodes 521.

Figure 18:
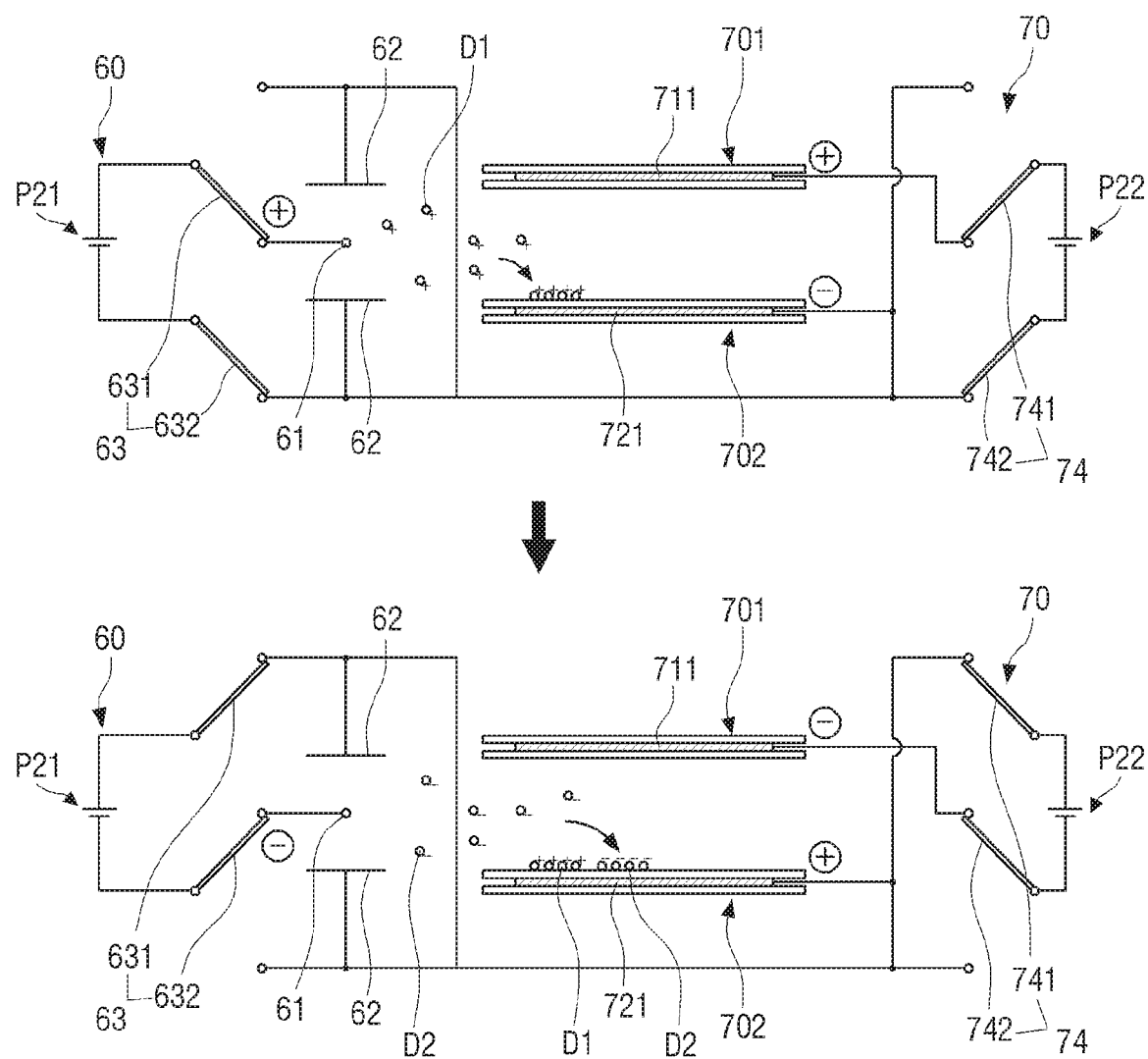
FIG. 18 illustrates an electronic dust collecting apparatus according to some embodiments of the present disclosure.

FIG. 18 illustrates an electronic dust collecting apparatus 1" according to certain embodiments of the present disclosure.

Hereinafter, the electronic dust collecting apparatus 1" according to another embodiment of the present disclosure will be described with reference to FIG. 18. However, the electronic dust collecting apparatus 1" shown in FIG. 18 may include components, most of which are the same or similar to the electronic dust collecting apparatus 1' shown in FIG. 17 and, thus, a repeated description will be omitted herein and the electronic dust collecting apparatus 1" will be described in terms of a difference from the electronic dust collecting apparatus 1' shown in FIG. 17.

As shown in the non-limiting example of FIG. 18, the electronic dust collecting apparatus 1" may include a charger 60 and a dust collector 70.

The charger 60 may include a plurality of discharge electrodes 61 and a plurality of corresponding electrodes 62 disposed between the plurality of discharge electrodes 61 and power of a high voltage may be supplied to the plurality of discharge electrodes 61 to charge pollutants in air via corona discharge.

The dust collector 70 may, according to some embodiments, include a dust collecting sheet formed by continuously bending one sheet and the dust collecting sheet may include a plurality of bent portions formed by continuously bending the dust collecting sheet in a zigzag form and may include a plurality of first electrodes 711 and a plurality of second electrodes 721 that are alternately arranged therein.

In addition, the dust collecting sheet may include a plurality of first flat surfaces 701 and a plurality of second flat surfaces 702 that are arranged to face each other at a predetermined interval by bending the dust collecting sheet, the first electrodes 711 may be arranged in the first flat surfaces 701, and the second electrodes 721 may be arranged in the second flat surfaces 702 and, accordingly, the plurality of first electrodes 711 and the plurality of second electrodes 721 that are alternately arranged in the dust collecting sheet may be arranged to face each other at a predetermined interval.

The charger 60 may, according to certain embodiments, include a first power source P21 that includes a direct current (DC) power source and supplies power to the discharge electrodes 61 and the corresponding electrodes 62 and a first switch 63 for converting polarity of a voltage applied to the discharge electrodes 61 from the first power source P21.

In detail, the first switch 63 may include first and second switch levers 631 and 632 that are connected to a plus electrode and a minus electrode of the first power source P21, respectively.

When the first switch lever 631 is connected to the discharge electrodes 61, the second switch lever 632 may be connected to the corresponding electrodes 62 and, when the first switch lever 631 is connected to the corresponding electrodes 62, the second switch lever 632 may be connected to the discharge electrodes 61 and, accordingly, the first switch 63 may convert polarity of power supplied to the discharge electrodes 61.

The dust collector 70 may include a second power source P22 that includes a DC power source and supplies power to the first electrodes 711 and the second electrodes 721 and a second switch 74 for converting polarity of a voltage applied to the first electrodes 711 from the second power source P22.

According to certain embodiments, the second switch 74 may include third and fourth switch levers 741 and 742 that are connected to a plus electrode and a minus electrode of the second power source P22, respectively.

When the third switch lever 741 is connected to the first electrodes 711, the fourth switch lever 742 may be connected to the second electrodes 721 and, when the third switch lever 741 is connected to the second electrodes 721, the fourth switch lever 742 may be connected to the first electrodes 711 and, accordingly, the second switch 74 may convert a polarity of power supplied to the first electrodes 711.

As such, the charger 60 and the dust collector 70 include the first and second switches 63 and 74 for converting a polarity of power supplied to the corresponding electrodes 62 and the first electrodes 711, respectively, to prevent electric charges from accumulating on the second electrodes 721 to prevent dust collecting performance of the dust collector 70 from being degraded.

In some embodiments, the first switch lever 631 of the charger 60 may be connected to the discharge electrodes 61 and the second switch lever 632 may be connected to the corresponding electrodes 62 and, accordingly, power of plus polarity may be supplied to the discharge electrodes 61 and power of minus polarity may be supplied to the corresponding electrodes 62. Thereby, the pollutants D1 in air passing through the charger 60 may be charged with plus polarity.

The third switch lever 741 of the dust collector 70 may be connected to the first electrodes 711 and the fourth switch lever 742 may be connected to the second electrodes 721 and, accordingly, power of plus polarity may be supplied to the first electrodes 711 and power of minus polarity may be supplied to the second electrodes 721. Accordingly, the pollutants D1 that are charged with plus polarity while passing through the charger 60 may be adsorbed onto an upper surface of the second flat surfaces 702 including the second electrodes 721 formed therein.

When the pollutants D1 charged with plus polarity accumulate on the second flat surfaces 702 for a predetermined time via an operation of the electronic dust collecting apparatus 1", the first switch lever 631 may be connected to the corresponding electrodes 62 and the second switch lever 632 may be connected to the discharge electrodes 61 via an operation of the first switch 63 of the charger 60. Accordingly, the pollutants D2 in air passing through the dust collector 70 may be charged with minus polarity.

In addition, the third switch lever 741 may be connected to the second electrodes 721 and the fourth switch lever 742 may be connected to the first electrodes 711 via an operation of the second switch 74 of the dust collector 70 and, accordingly, the pollutants D2 charged with minus polarity through the charger 60 may be adsorbed onto the second flat surfaces 702 including the second electrodes 721 formed therein.

Accordingly, plus electric charges that accumulate on the second electrodes 721 due to the pollutants D1 that previously accumulate on the second flat surfaces 702 may be neutralized by minus electric charges of the pollutants D2 that are charged with minus polarity.

Then, when the pollutants D2 charged with minus polarity accumulate on the second flat surfaces 702 and minus electric charges accumulate on the second electrodes 721, power of plus polarity may be re-supplied to the corresponding electrodes 62 and the first electrodes 711 via operations of the first and second switches 63 and 74 to neutralize minus electric charges that accumulate on the second electrodes 721.

As such, the charger 60 and the dust collector 70 may neutralize electric charges accumulating on the second electrodes 721 via a simple structure through the first and second switches 63 and 74 that are connected to the first and second power sources P21 and P22 that include a DC power source, respectively, thereby preventing dust collecting performance of the dust collector 70 from being degraded.

In addition, the first and second switches 63 and 74 for automatically neutralizing electric charges accumulating on the second electrodes 721 with a predetermined period may be easily embodied in that a switching period of the first and second switches 63 and 74 is also easily adjusted via a simple prior art.

Although the various embodiments of the present disclosure have been separately described thus far, the embodiments are not inevitably used alone and the configuration and operation of the embodiments may be combined with at least one embodiments of the present disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic dust collecting apparatus comprising:
a charger; and
a dust collector installed downstream of the charger,
wherein the dust collector comprises a dust collecting sheet comprising a plurality of first electrodes and a plurality of second electrodes which are alternately arranged therein and a plurality of bent portions that are bent in a zigzag form in such a way that the plurality of first electrodes and the plurality of second electrodes face each other, and
wherein the dust collecting sheet comprises a first sheet and a second sheet laminated to one surface of the first sheet; and
wherein the plurality of first and second electrodes are configured with a conductive pattern printed or deposited on the one surface of the first sheet.

2. The electronic dust collecting apparatus of claim 1, wherein the plurality of first electrodes comprises a high-voltage electrode; and
wherein the plurality of second electrodes comprises a low-voltage electrode with a lower voltage than the plurality of first electrodes.

3. The electronic dust collecting apparatus of claim 2, wherein the plurality of first and second electrodes are disposed along a width direction of the dust collecting sheet; and
wherein the plurality of first electrodes and the plurality of second electrodes are alternately stacked in a longitudinal direction of the dust collecting sheet.

4. The electronic dust collecting apparatus of claim 1, wherein the plurality of bent portions is disposed in a zigzag form in a longitudinal direction of the dust collecting sheet between the plurality of first electrodes and the plurality of second electrodes.

5. The electronic dust collecting apparatus of claim 1, wherein the dust collecting sheet comprises a plurality of openings that are disposed in the plurality of bent portions, respectively.

6. The electronic dust collecting apparatus of claim 5, wherein the dust collecting sheet comprises a plurality of slits that are disposed in the plurality of bent portions, respectively; and
wherein the plurality of slits form the plurality of openings via bending of the dust collecting sheet, respectively.

7. The electronic dust collecting apparatus of claim 6, wherein the plurality of slits are disposed in parallel to the plurality of first and second electrodes in a longitudinal direction of the plurality of first electrodes and the plurality of second electrodes.

8. The electronic dust collecting apparatus of claim 7, wherein the slits are disposed in a central portion between the plurality of first electrodes and the plurality of second electrodes on the dust collecting sheet.

9. The electronic dust collecting apparatus of claim 7, wherein a portion of the plurality of second electrodes is exposed to an external side of the dust collecting sheet.

10. The electronic dust collecting apparatus of claim 9, wherein the plurality of slits are disposed along a one-side edge of the plurality of second electrodes and expose the one-side edge of the plurality of second electrodes.

11. The electronic dust collecting apparatus of claim 10, wherein the plurality of second electrodes comprises a plurality of grooves concave from the one-side edge; and
wherein the plurality of slits are disposed along the one-side edge of the plurality of second electrodes.

12. The electronic dust collecting apparatus of claim 9, wherein the dust collecting sheet comprises at least one of a plurality of through holes or a plurality of through slits configured to externally expose the plurality of second electrodes.

13. The electronic dust collecting apparatus of claim 1, wherein the plurality of first and second electrodes are disposed of a material with electric resistance of about $10^7$ Ω·cm or more.

14. The electronic dust collecting apparatus of claim 2, wherein the charger comprises a plurality of discharge electrodes with a high voltage applied thereto and a plurality of corresponding electrodes arranged between the plurality of discharge electrodes;
wherein plus power and minus power are alternately supplied to the plurality of discharge electrodes by a first power source; and
wherein plus power and minus power are alternately supplied to the plurality of first electrodes to correspond to the plurality of discharge electrodes by a second power source.

15. The electronic dust collecting apparatus of claim 14, wherein the charger comprises a first switch configured to convert polarity of a voltage applied to the plurality of discharge electrodes and the plurality of corresponding electrodes; and
wherein the dust collector comprises a second switch configured to convert polarity of a voltage applied to the plurality of first electrodes and the plurality of second electrodes.

16. An electronic dust collecting apparatus comprising:
a charger; and
a dust collector downstream of the charger,
wherein the dust collector comprises:
a first dust collecting sheet comprising a plurality of high-voltage electrodes arranged therein and a plurality of first bent portions that are bent in a zigzag form between the plurality of high-voltage electrodes; and
a second dust collecting sheet comprising a plurality of low-voltage electrodes arranged therein and a plurality of second bent portions that are bent in a zigzag form between the plurality of low-voltage electrodes, and
wherein the first dust collecting sheet and the second dust collecting sheet are arranged in an interdigital structure in which the plurality of high-voltage electrodes and the plurality of low-voltage electrodes alternately face each other.

17. The electronic dust collecting apparatus of claim 16, wherein the first and second dust collecting sheets comprise a plurality of openings that are disposed in the plurality of first and second bent portions, respectively; and
wherein an end of a first bent portion, which is adjacent to the second dust collecting sheet, and an end of a second bent portion, which is adjacent to the first dust collecting sheet, are open and a low-voltage electrode is inserted between the high-voltage electrodes facing high-voltage electrodes.

* * * * *